(12) United States Patent
Chen et al.

(10) Patent No.: US 7,349,554 B2
(45) Date of Patent: Mar. 25, 2008

(54) MAZE PATTERN ANALYSIS

(75) Inventors: Liyong Chen, Beijing (CN); Yingnong Dang, Beijing (CN); Xiaoxu Ma, Cambridge, MA (US); Jian Wang, Beijing (CN); Qiang Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 798 days.

(21) Appl. No.: 10/932,803

(22) Filed: Sep. 2, 2004

(65) Prior Publication Data

US 2006/0045307 A1    Mar. 2, 2006

(51) Int. Cl.
 *H04K 1/00* (2006.01)
(52) U.S. Cl. .................................................... 382/100
(58) Field of Classification Search ................ 382/100, 382/181; 235/456, 494; 380/54; 705/50
See application file for complete search history.

(56) References Cited

U.S. PATENT DOCUMENTS 5,091,966 A * 2/1992 Bloomberg et al. ......... 382/203
5,128,525 A * 7/1992 Stearns et al. .............. 235/454
5,168,147 A * 12/1992 Bloomberg .................. 235/456
7,263,324 B2 * 8/2007 Takagi et al. ............... 399/333

* cited by examiner

*Primary Examiner*—Jose L. Couso
(74) *Attorney, Agent, or Firm*—Banner & Witcoff, Ltd.

(57) ABSTRACT

Processes and apparatuses analyze an image of maze pattern in order to extract bits encoded in the maze pattern. Grid lines of a maze pattern are determined. Directions for effective pixels of associated bars are estimated and are grouped into clusters. Lines are estimated for selected effective pixels of a selected cluster that is associated with a first principal direction. Grid lines of another cluster are determined, where the other cluster is associated with a second principal direction that is perpendicular with the first principal direction. Estimated lines are pruned based on slope variation analysis, grouped based on a distance analysis, and a best fit line is selected from each group. Affine parameters are determined from best fit lines. The correct orientation of a maze pattern is obtained by determining a type of missing corner of the maze pattern. Bits are extracted from the image of maze pattern by processing gray level values of the associated maze pattern cells.

54 Claims, 28 Drawing Sheets

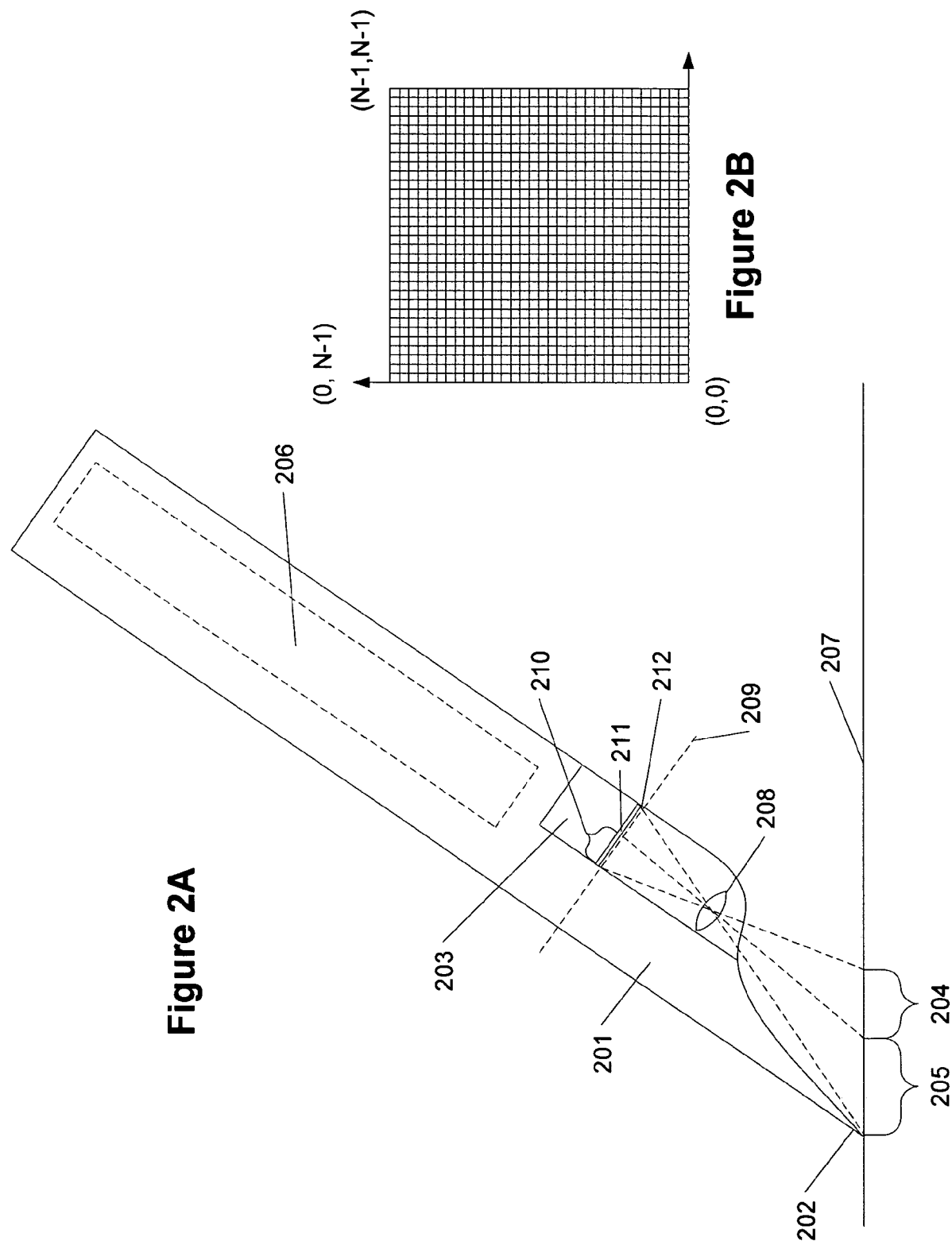

Figure 3A 0000010 00 01100 0101 001 111010 0 011001 0 010110 111 0110 01101 01 0111111
Figure 3B 0000000 0011101 0100111 1110100 0111010 1000101 1110100 0100111 0011101
Figure 3C 000100100 001111110 010111101 010011001 011100111 001011010 011000011
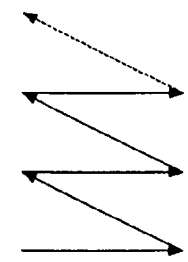
Figure 3E
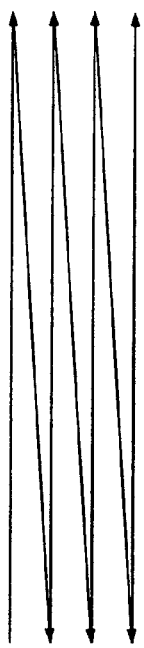
Figure 3F
Figure 3D

$$o = \theta + \begin{cases} 0 - no\ a \\ \dfrac{\pi}{2} - no\ b \\ \pi - no\ c \\ \dfrac{3\pi}{2} - no\ d \end{cases}$$

MAZE PATTERN ANALYSIS

TECHNICAL FIELD

The present invention relates to interacting with a medium using a digital pen. More particularly, the present invention relates to analyzing a maze pattern and extracting bits from the maze pattern.

BACKGROUND

Computer users are accustomed to using a mouse and keyboard as a way of interacting with a personal computer. While personal computers provide a number of advantages over written documents, most users continue to perform certain functions using printed paper. Some of these functions include reading and annotating written documents. In the case of annotations, the printed document assumes a greater significance because of the annotations placed on it by the user. One of the difficulties, however, with having a printed document with annotations is the later need to have the annotations entered back into the electronic form of the document. This requires the original user or another user to wade through the annotations and enter them into a personal computer. In some cases, a user will scan in the annotations and the original text, thereby creating a new document. These multiple steps make the interaction between the printed document and the electronic version of the document difficult to handle on a repeated basis. Further, scanned-in images are frequently non-modifiable. There may be no way to separate the annotations from the original text. This makes using the annotations difficult. Accordingly, an improved way of handling annotations is needed.

One technique of capturing handwritten information is by using a pen whose location may be determined during writing. One pen that provides this capability is the Anoto pen by Anoto Inc. This pen functions by using a camera to capture an image of paper encoded with a predefined pattern. An example of the image pattern is shown in FIG. 11. This pattern is used by the Anoto pen (by Anoto Inc.) to determine a location of a pen on a piece of paper. However, it is unclear how efficient the determination of the location is with the system used by the Anoto pen. To provide efficient determination of the location of the captured image, a system is needed that provides an efficient extraction of bits from a captured image of the maze pattern.

SUMMARY

Aspects of the present invention provide solutions to at least one of the issues mentioned above, thereby enabling one to extract bits from a maze pattern to locate a position or positions of the captured image on a viewed document. The viewed document may be on paper, LCD screen, or any other medium with the predefined pattern. Aspects of the present invention include analyzing a document image and extracting bits of the associated m-array.

With one aspect of the invention, the grid lines of a maze pattern are determined. The direction for each effective pixel of an associated bar is estimated. The estimated directions are grouped into clusters. Lines are estimated for selected effective pixels of a selected cluster that is associated with a first principal direction of the maze pattern.

With another aspect of the invention, regression analysis is used to determine estimated lines.

With another aspect of the invention, estimated lines are grouped based on slope variation analysis. A best fit line is selected from each group.

With another aspect of the invention, grid lines of another cluster are determined, where the other cluster is associated with a second principal direction that is perpendicular or nearly perpendicular with the first principal direction.

With another aspect of the invention, affine parameters are determined from grouped lines. Affine parameters may include horizontal and vertical rotations of the maze pattern, horizontal and vertical spacings of the grid lines, and horizontal and vertical offsets of the image center.

With another aspect of the invention, grid lines are tuned to obtain a more refined approximation of the actual grid lines of the maze pattern.

With another aspect of the invention, the correct orientation of a maze pattern is obtained by determining a type of missing corner of the maze pattern.

With another aspect of the invention, a bit is extracted from the maze pattern by processing gray level values of the associated maze pattern cell. In a variation, gray level values of neighboring maze pattern cells are further processed.

These and other aspects of the present invention will become known through the following drawings and associated description.

BRIEF DESCRIPTION OF DRAWINGS

The foregoing summary of the invention, as well as the following detailed description of preferred embodiments, is better understood when read in conjunction with the accompanying drawings, which are included by way of example, and not by way of limitation with regard to the claimed invention.

FIGS. 2A and 2B show an image capture system and corresponding captured image in accordance with embodiments of the present invention.

FIGS. 3A through 3F show various sequences and folding techniques in accordance with embodiments of the present invention.

DETAILED DESCRIPTION

Aspects of the present invention relate to determining the location of a captured image in relation to a larger image. The location determination method and system described herein may be used in combination with a multi-function pen.

The following is separated by subheadings for the benefit of the reader. The subheadings include: terms, general-purpose computer, image capturing pen, encoding of array, decoding, error correction, location determination, and maze pattern analysis.

Terms

Pen—any writing implement that may or may not include the ability to store ink. In some examples, a stylus with no ink capability may be used as a pen in accordance with embodiments of the present invention.

Camera—an image capture system that may capture an image from paper or any other medium.

General Purpose Computer

Figure 1:
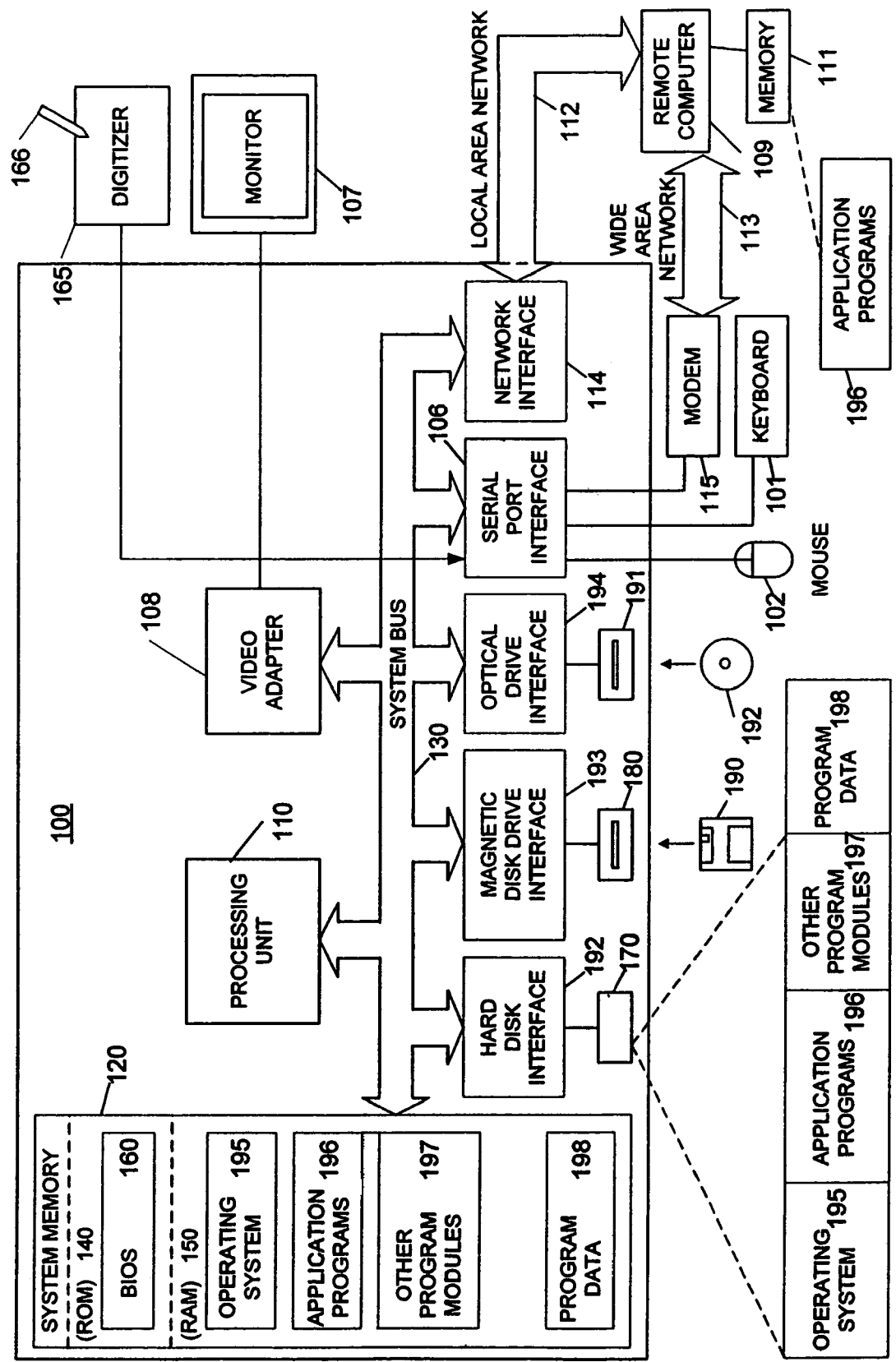
FIG. 1 shows a general description of a computer that may be used in conjunction with embodiments of the present invention.

FIG. 1 is a functional block diagram of an example of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the serial port is shown, in practice, the pen digitizer 165 may be coupled to the processing unit 110 directly, via a parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP, Bluetooth, IEEE 802.11x and the like is presumed, and the system can be operated in a client-server configuration to permit a user to retrieve web pages from a web-based server. Any of various conventional web browsers can be used to display and manipulate data on web pages.

Image Capturing Pen

Aspects of the present invention include placing an encoded data stream in a displayed form that represents the encoded data stream. (For example, as will be discussed with FIG. 4B, the encoded data stream is used to create a graphical pattern.) The displayed form may be printed paper (or other physical medium) or may be a display projecting the encoded data stream in conjunction with another image or set of images. For example, the encoded data stream may be represented as a physical graphical image on the paper or a graphical image overlying the displayed image (e.g., representing the text of a document) or may be a physical (non-modifiable) graphical image on a display screen (so any image portion captured by a pen is locatable on the display screen).

This determination of the location of a captured image may be used to determine the location of a user's interaction with the paper, medium, or display screen. In some aspects of the present invention, the pen may be an ink pen writing on paper. In other aspects, the pen may be a stylus with the user writing on the surface of a computer display. Any interaction may be provided back to the system with knowledge of the encoded image on the document or supporting the document displayed on the computer screen. By repeatedly capturing images with a camera in the pen or stylus as the pen or stylus traverses a document, the system can track movement of the stylus being controlled by the user. The displayed or printed image may be a watermark associated with the blank or content-rich paper or may be a watermark associated with a displayed image or a fixed coding overlying a screen or built into a screen.

FIGS. 2A and 2B show an illustrative example of pen 201 with a camera 203. Pen 201 includes a tip 202 that may or may not include an ink reservoir. Camera 203 captures an image 204 from surface 207. Pen 201 may further include additional sensors and/or processors as represented in broken box 206. These sensors and/or processors 206 may also include the ability to transmit information to another pen 201 and/or a personal computer (for example, via Bluetooth or other wireless protocols).

FIG. 2B represents an image as viewed by camera 203. In one illustrative example, the field of view of camera 203 (i.e., the resolution of the image sensor of the camera) is 32×32 pixels (where N=32). In the embodiment, a captured image (32 pixels by 32 pixels) corresponds to an area of approximately 5 mm by 5 mm of the surface plane captured by camera 203. Accordingly, FIG. 2B shows a field of view of 32 pixels long by 32 pixels wide. The size of N is adjustable, such that a larger N corresponds to a higher image resolution. Also, while the field of view of the camera 203 is shown as a square for illustrative purposes here, the field of view may include other shapes as is known in the art.

The images captured by camera 203 may be defined as a sequence of image frames $\{I_i\}$, where $I_i$ is captured by the pen 201 at sampling time $t_i$. The sampling rate may be large or small, depending on system configuration and performance requirement. The size of the captured image frame may be large or small, depending on system configuration and performance requirement.

The image captured by camera 203 may be used directly by the processing system or may undergo pre-filtering. This pre-filtering may occur in pen 201 or may occur outside of pen 201 (for example, in a personal computer).

The image size of FIG. 2B is 32×32 pixels. If each encoding unit size is 3×3 pixels, then the number of captured encoded units would be approximately 100 units. If the encoding unit size is 5×5 pixels, then the number of captured encoded units is approximately 36.

FIG. 2A also shows the image plane 209 on which an image 210 of the pattern from location 204 is formed. Light received from the pattern on the object plane 207 is focused by lens 208. Lens 208 may be a single lens or a multi-part lens system, but is represented here as a single lens for simplicity. Image capturing sensor 211 captures the image 210.

The image sensor 211 may be large enough to capture the image 210. Alternatively, the image sensor 211 may be large enough to capture an image of the pen tip 202 at location 212. For reference, the image at location 212 is referred to as the virtual pen tip. It is noted that the virtual pen tip location with respect to image sensor 211 is fixed because of the constant relationship between the pen tip, the lens 208, and the image sensor 211.

The following transformation $F_{S \rightarrow P}$ transforms position coordinates in the image captured by camera to position coordinates in the real image on the paper:

$$L_{paper} = F_{S \rightarrow P}(L_{Sensor})$$

During writing, the pen tip and the paper are on the same plane. Accordingly, the transformation from the virtual pen tip to the real pen tip is also $F_{S \rightarrow P}$:

$$L_{pentip} = F_{S \rightarrow P}(L_{virtual-pentip})$$

The transformation $F_{S \to P}$ may be estimated as an affine transform. This simplifies as:

$$F_{S \to P} = \begin{bmatrix} \frac{\sin\theta_y}{s_x} & \frac{\cos\theta_y}{s_x} & 0 \\ \frac{-\sin\theta_x}{s_y} & \frac{\cos\theta_x}{s_y} & 0 \\ 0 & 0 & 1 \end{bmatrix}$$

as the estimation of $F_{S \to P}$, in which $\theta_x$, $\theta_y$, $s_x$, and $s_y$ are the rotation and scale of two orientations of the pattern captured at location 204. Further, one can refine $F'_{S \to P}$ by matching the captured image with the corresponding real image on paper. "Refine" means to get a more precise estimation of the transformation $F_{S \to P}$ by a type of optimization algorithm referred to as a recursive method. The recursive method treats the matrix $F'_{S \to P}$ as the initial value. The refined estimation describes the transformation between S and P more precisely.

Next, one can determine the location of virtual pen tip by calibration.

One places the pen tip 202 on a fixed location $L_{pentip}$ on paper. Next, one tilts the pen, allowing the camera 203 to capture a series of images with different pen poses. For each image captured, one may obtain the transformation $F_{S \to P}$. From this transformation, one can obtain the location of the virtual pen tip $L_{virtual-pentip}$:

$$L_{virtual-pentip} = F_{P \to S}(L_{pentip})$$

where $L_{pentip}$ is initialized as (0, 0) and $$F_{P \to S} = (F_{S \to P})^{-1}$$

By averaging the $L_{virtual-pentip}$ obtained from each image, a location of the virtual pen tip $L_{virtual-pentip}$ may be determined. With $L_{virtual-pentip}$ one can get a more accurate estimation of $L_{pentip}$. After several times of iteration, an accurate location of virtual pen tip $L_{virtual-pentip}$ may be determined.

The location of the virtual pen tip $L_{virtual-pentip}$ is now known. One can also obtain the transformation $F_{S \to P}$ from the images captured. Finally, one can use this information to determine the location of the real pen tip $L_{pentip}$:

$$L_{pentip} = F_{S \to P}(L_{virtual-pentip})$$

Encoding of Array

A two-dimensional array may be constructed by folding a one-dimensional sequence. Any portion of the two-dimensional array containing a large enough number of bits may be used to determine its location in the complete two-dimensional array. However, it may be necessary to determine the location from a captured image or a few captured images. So as to minimize the possibility of a captured image portion being associated with two or more locations in the two-dimensional array, a non-repeating sequence may be used to create the array. One property of a created sequence is that the sequence does not repeat over a length (or window) n. The following describes the creation of the one-dimensional sequence then the folding of the sequence into an array.

Sequence Construction

A sequence of numbers may be used as the starting point of the encoding system. For example, a sequence (also referred to as an m-sequence) may be represented as a q-element set in field $F_q$. Here, $q=p^n$ where $n \geq 1$ and p is a prime number. The sequence or m-sequence may be generated by a variety of different techniques including, but not limited to, polynomial division. Using polynomial division, the sequence may be defined as follows:

$$\frac{R_l(x)}{P_n(x)}$$

where $P_n(x)$ is a primitive polynomial of degree n in field $F_q[x]$ (having $q^n$ elements). $R_l(x)$ is a nonzero polynomial of degree l (where l<n) in field $F_q[x]$. The sequence may be created using an iterative procedure with two steps: first, dividing the two polynomials (resulting in an element of field $F_q$) and, second, multiplying the remainder by x. The computation stops when the output begins to repeat. This process may be implemented using a linear feedback shift register as set forth in an article by Douglas W. Clark and Lih-Jyh Weng, "Maximal and Near-Maximal Shift Register Sequences: Efficient Event Counters and Easy Discrete Logarithms," IEEE Transactions on Computers 43.5 (May 1994, pp 560-568). In this environment, a relationship is established between cyclical shifting of the sequence and polynomial $R_l(x)$: changing $R_l(x)$ only cyclically shifts the sequence and every cyclical shifting corresponds to a polynomial $R_l(x)$. One of the properties of the resulting sequence is that, the sequence has a period of $q^n-1$ and within a period, over a width (or length) n, any portion exists once and only once in the sequence. This is called the "window property". Period $q^n-1$ is also referred to as the length of the sequence and n as the order of the sequence.

The process described above is but one of a variety of processes that may be used to create a sequence with the window property.

Array Construction

The array (or m-array) that may be used to create the image (of which a portion may be captured by the camera) is an extension of the one-dimensional sequence or m-sequence. Let A be an array of period $(m_1, m_2)$, namely $A(k+m_1, l) = A(k, l+m_2) = A(k, l)$. When an $n_1 \times n_2$ window shifts through a period of A, all the nonzero $n_1 \times n_2$ matrices over $F_q$ appear once and only once. This property is also referred to as a "window property" in that each window is unique. A widow may then be expressed as an array of period $(m_1, m_2)$ (with $m_1$ and $m_2$ being the horizontal and vertical number of bits present in the array) and order $(n_1, n_2)$.

A binary array (or m-array) may be constructed by folding the sequence. One approach is to obtain a sequence then fold it to a size of $m_1 \times m_2$ where the length of the array is $L = m_1 \times m_2 = 2^n - 1$. Alternatively, one may start with a predetermined size of the space that one wants to cover (for example, one sheet of paper, 30 sheets of paper or the size of a computer monitor), determine the area $(m_1 \times m_2)$, then use the size to let $L \geq m_1 \times m_2$, where $L = 2^n - 1$.

A variety of different folding techniques may be used. For example, FIGS. 3A through 3C show three different sequences. Each of these may be folded into the array shown as FIG. 3D. The three different folding methods are shown as the overlay in FIG. 3D and as the raster paths in FIGS. 3E and 3F. We adopt the folding method shown in FIG. 3D.

To create the folding method as shown in FIG. 3D, one creates a sequence $\{a_i\}$ of length L and order n. Next, an array $\{b_{kl}\}$ of size $m_1 \times m_2$, where $\gcd(m_1, m_2)=1$ and $L=m_1 \times m_2$, is created from the sequence $\{a_i\}$ by letting each bit of the array be calculated as shown by equation 1:

$$b_{kl}=a_i, \text{ where } k=i \bmod(m_1), l=i \bmod(m_2), i=0, \ldots, L-1. \quad (1)$$

This folding approach may be alternatively expressed as laying the sequence on the diagonal of the array, then continuing from the opposite edge when an edge is reached.

Figures 4A, 4B:
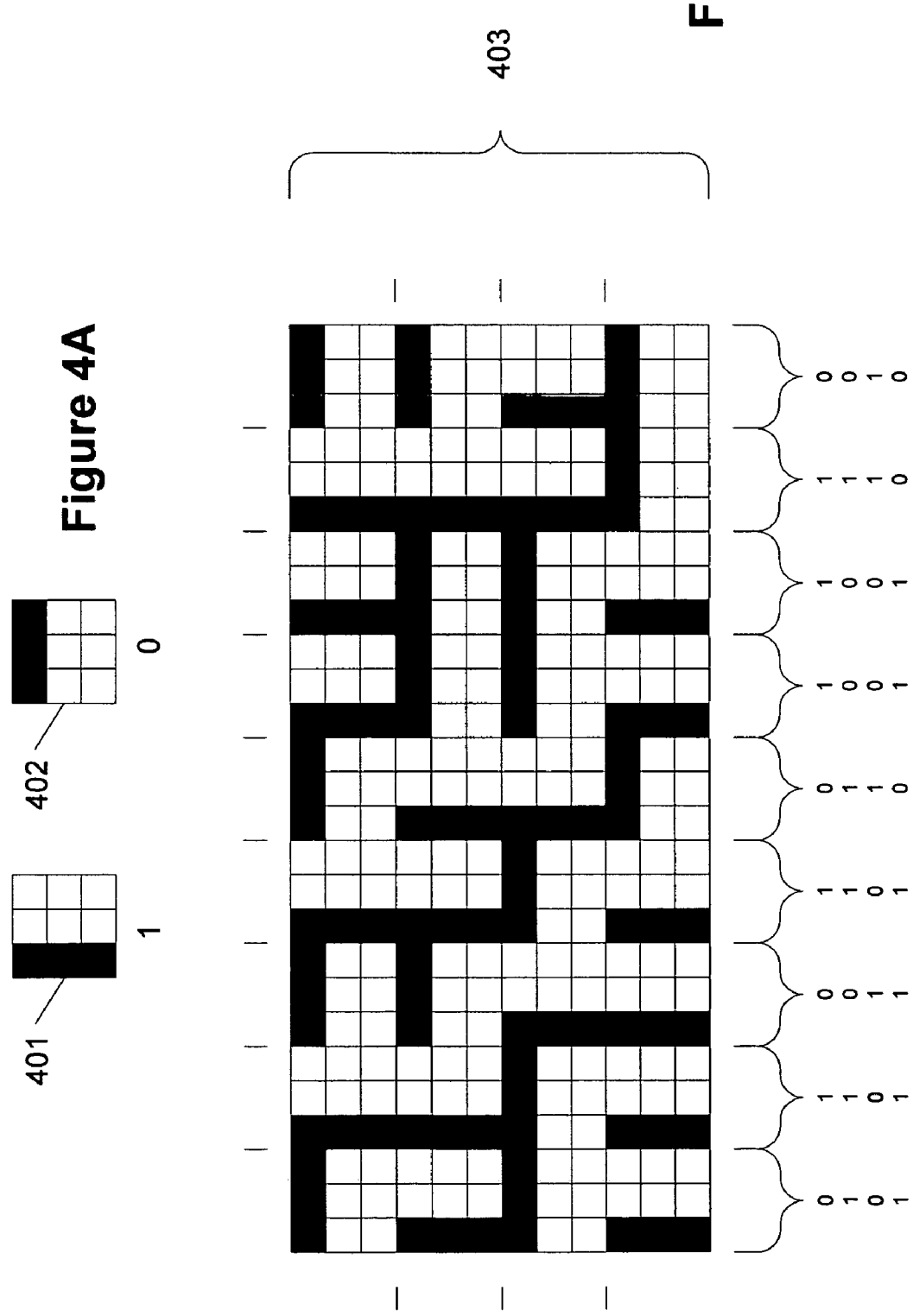
FIGS. 4A through 4E show various encoding systems in accordance with embodiments of the present invention.
Figure 11:
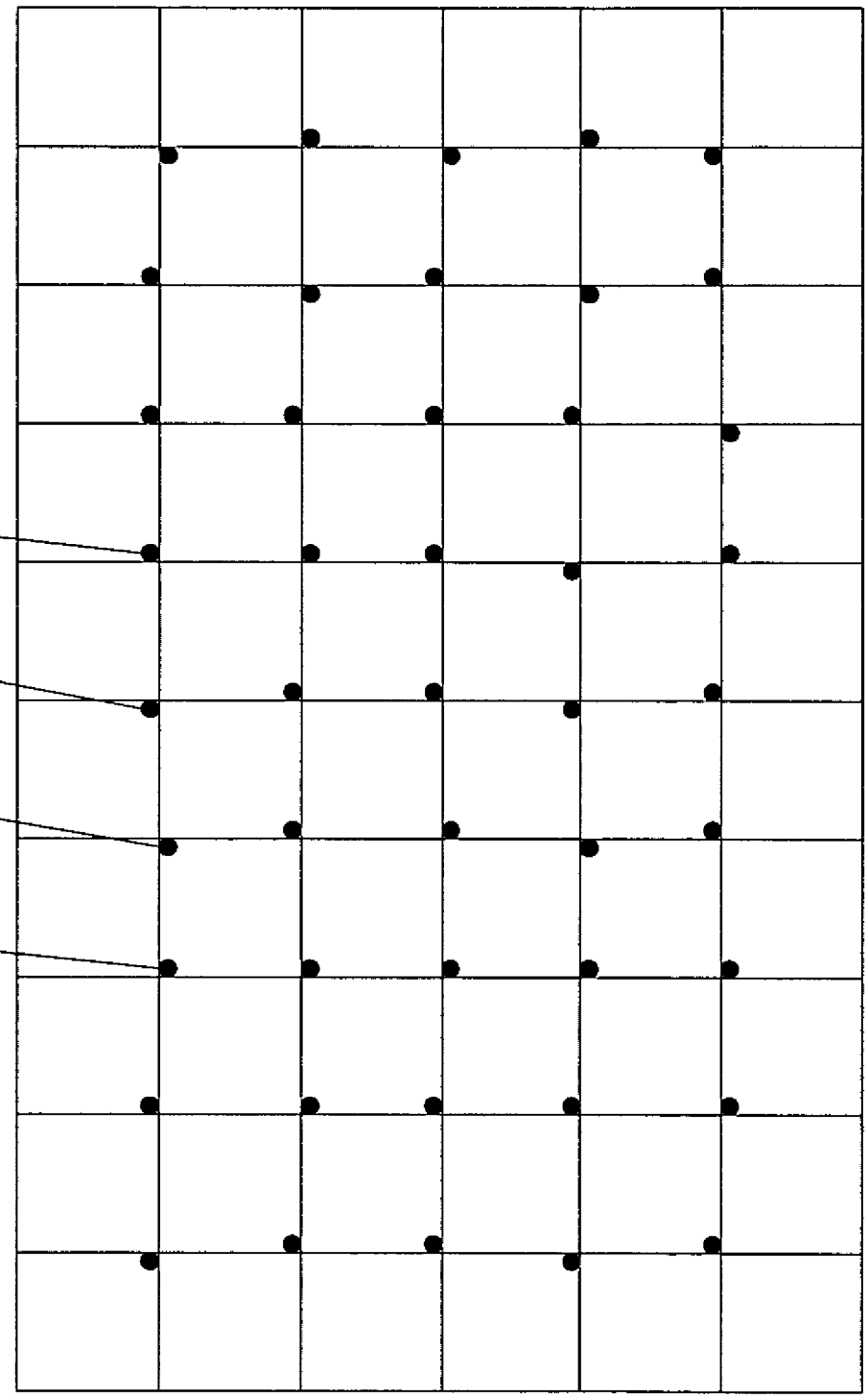
FIG. 11 shows a representation of encoding space in a document according to prior art.

FIG. 4A shows sample encoding techniques that may be used to encode the array of FIG. 3D. It is appreciated that other encoding techniques may be used. For example, an alternative coding technique is shown in FIG. 11.

Figure 4C:
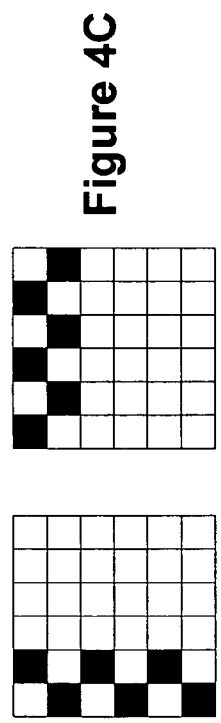
Figures 4D, 4E:
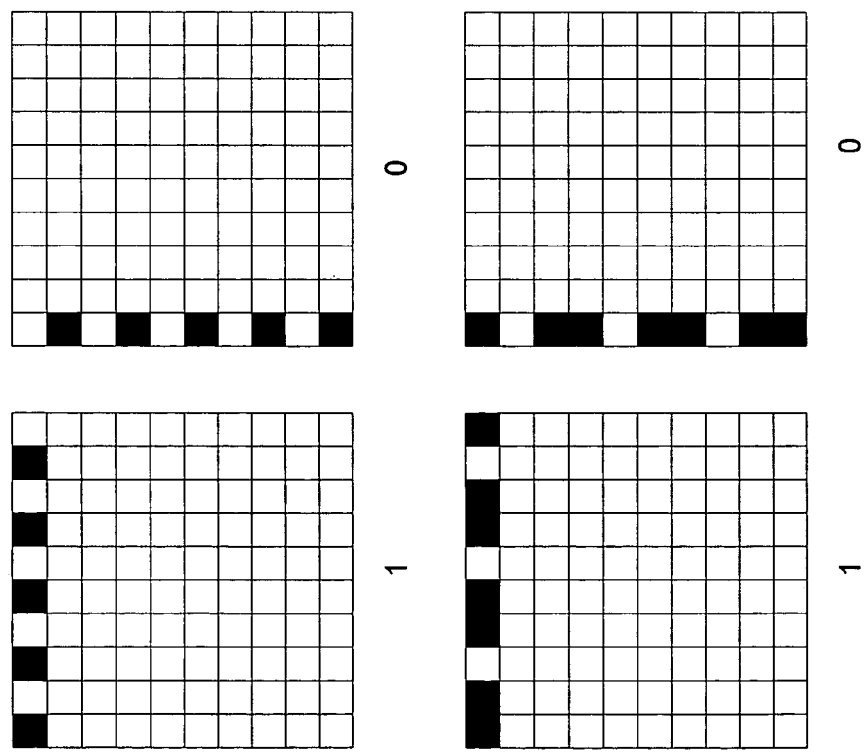

Referring to FIG. 4A, a first bit 401 (for example, "1") is represented by a column of dark ink. A second bit 402 (for example, "0") is represented by a row of dark ink. It is appreciated that any color ink may be used to represent the various bits. The only requirement in the color of the ink chosen is that it provides a significant contrast with the background of the medium to be differentiable by an image capture system. The bits in FIG. 4A are represented by a 3×3 matrix of cells. The size of the matrix may be modified to be any size as based on the size and resolution of an image capture system. Alternative representation of bits 0 and 1 are shown in FIGS. 4C-4E. It is appreciated that the representation of a one or a zero for the sample encodings of FIGS. 4A-4E may be switched without effect. FIG. 4C shows bit representations occupying two rows or columns in an interleaved arrangement. FIG. 4D shows an alternative arrangement of the pixels in rows and columns in a dashed form. Finally FIG. 4E shows pixel representations in columns and rows in an irregular spacing format (e.g., two dark dots followed by a blank dot).

Referring back to FIG. 4A, if a bit is represented by a 3×3 matrix and an imaging system detects a dark row and two white rows in the 3×3 region, then a zero is detected (or one). If an image is detected with a dark column and two white columns, then a one is detected (or a zero).

Here, more than one pixel or dot is used to represent a bit. Using a single pixel (or bit) to represent a bit is fragile. Dust, creases in paper, non-planar surfaces, and the like create difficulties in reading single bit representations of data units. However, it is appreciated that different approaches may be used to graphically represent the array on a surface. Some approaches are shown in FIGS. 4C through 4E. It is appreciated that other approaches may be used as well. One approach is set forth in FIG. 11 using only space-shifted dots.

A bit stream is used to create the graphical pattern 403 of FIG. 4B. Graphical pattern 403 includes 12 rows and 18 columns. The rows and columns are formed by a bit stream that is converted into a graphical representation using bit representations 401 and 402. FIG. 4B may be viewed as having the following bit representation:

$$\begin{bmatrix} 0 & 1 & 0 & 1 & 0 & 1 & 1 & 1 & 0 \\ 1 & 1 & 0 & 1 & 1 & 0 & 0 & 1 & 0 \\ 0 & 0 & 1 & 0 & 1 & 0 & 0 & 1 & 1 \\ 1 & 0 & 1 & 1 & 0 & 1 & 1 & 0 & 0 \end{bmatrix}$$

Decoding

When a person writes with the pen of FIG. 2A or moves the pen close to the encoded pattern, the camera captures an image. For example, pen 201 may utilize a pressure sensor as pen 201 is pressed against paper and pen 201 traverses a document on the paper. The image is then processed to determine the orientation of the captured image with respect to the complete representation of the encoded image and extract the bits that make up the captured image.

Figures 5A, 5B, 5C, 5D:
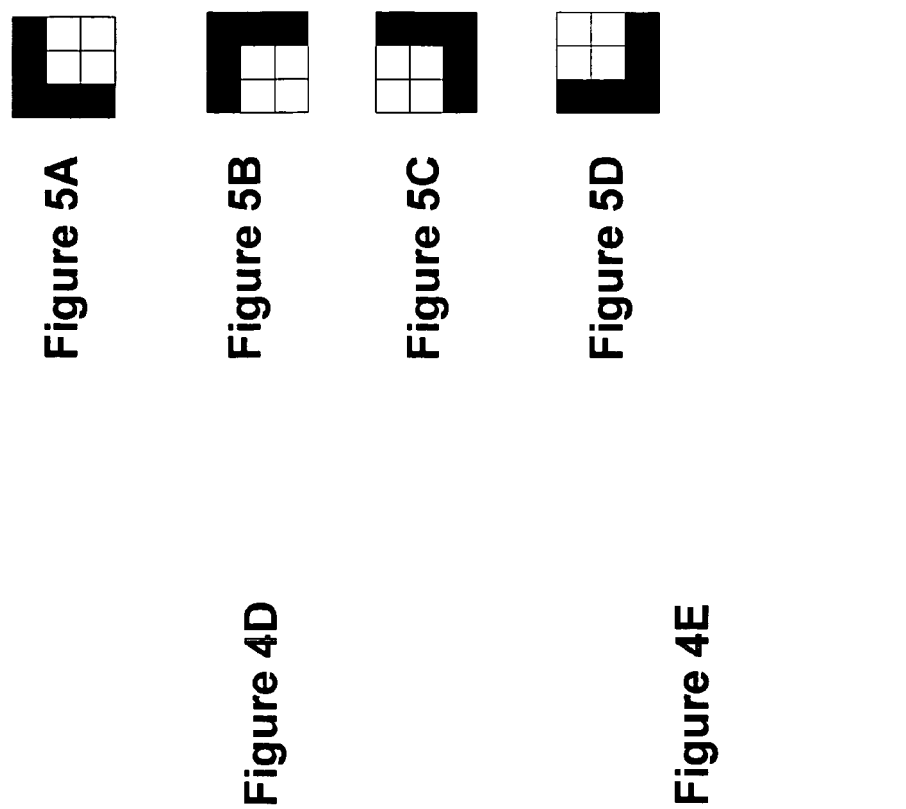
FIGS. 5A through 5D show four possible resultant corners associated with the encoding system according to FIGS. 4A and 4B.

For the determination of the orientation of the captured image relative to the whole encoded area, one may notice that not all the four conceivable corners shown in FIG. 5A-5D can present in the graphical pattern 403. In fact, with the correct orientation, the type of corner shown in FIG. 5A cannot exist in the graphical pattern 403. Therefore, the orientation in which the type of corner shown in FIG. 5A is missing is the right orientation.

Figures 6, 7:
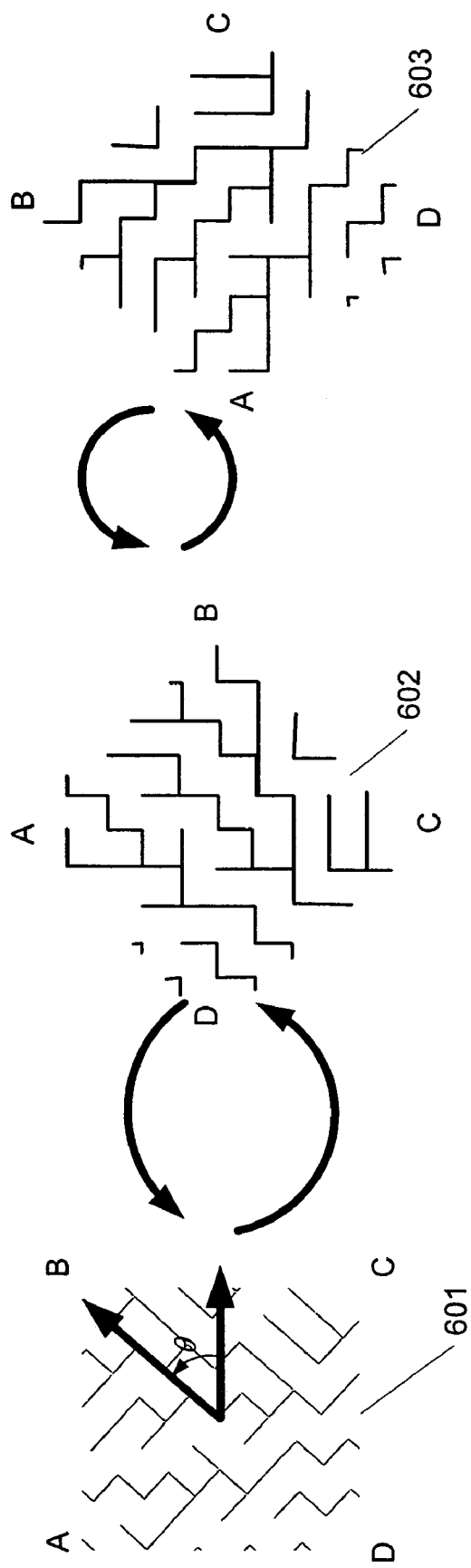
FIG. 6 shows rotation of a captured image portion in accordance with embodiments of the present invention.
FIG. 7 shows various angles of rotation used in conjunction with the coding system of FIGS. 4A through 4E.

Continuing to FIG. 6, the image captured by a camera 601 may be analyzed and its orientation determined so as to be interpretable as to the position actually represented by the image 601. First, image 601 is reviewed to determine the angle θ needed to rotate the image so that the pixels are horizontally and vertically aligned. It is noted that alternative grid alignments are possible including a rotation of the underlying grid to a non-horizontal and vertical arrangement (for example, 45 degrees). Using a non-horizontal and vertical arrangement may provide the probable benefit of eliminating visual distractions from the user, as users may tend to notice horizontal and vertical patterns before others. For purposes of simplicity, the orientation of the grid (horizontal and vertical and any other rotation of the underlying grid) is referred to collectively as the predefined grid orientation.

Next, image 601 is analyzed to determine which corner is missing. The rotation amount o needed to rotate image 601 to an image ready for decoding 603 is shown as o=(θ plus a rotation amount {defined by which corner missing}). The rotation amount is shown by the equation in FIG. 7. Referring back to FIG. 6, angle θ is first determined by the layout of the pixels to arrive at a horizontal and vertical (or other predefined grid orientation) arrangement of the pixels and the image is rotated as shown in 602. An analysis is then conducted to determine the missing corner and the image 602 rotated to the image 603 to set up the image for decoding. Here, the image is rotated 90 degrees counter-clockwise so that image 603 has the correct orientation and can be used for decoding.

It is appreciated that the rotation angle θ may be applied before or after rotation of the image 601 to account for the missing corner. It is also appreciated that by considering noise in the captured image, all four types of corners may be present. We may count the number of corners of each type and choose the type that has the least number as the corner type that is missing.

Finally, the code in image 603 is read out and correlated with the original bit stream used to create image 403. The correlation may be performed in a number of ways. For example, it may be performed by a recursive approach in which a recovered bit stream is compared against all other bit stream fragments within the original bit stream. Second, a statistical analysis may be performed between the recovered bit stream and the original bit stream, for example, by using a Hamming distance between the two bit streams. It is appreciated that a variety of approaches may be used to determine the location of the recovered bit stream within the original bit stream.

As will be discussed, maze pattern analysis obtains recovered bits from image 603. Once one has the recovered bits, one needs to locate the captured image within the original array (for example, the one shown in FIG. 4B). The process of determining the location of a segment of bits within the entire array is complicated by a number of items. First, the actual bits to be captured may be obscured (for example, the camera may capture an image with handwriting that obscures the original code). Second, dust, creases, reflections, and the like may also create errors in the captured image. These errors make the localization process more difficult. In this regard, the image capture system may need to function with non-sequential bits extracted from the image. The following represents a method for operating with non-sequential bits from the image.

Let the sequence (or m-sequence) I correspond to the power series $I(x)=1/P_n(x)$, where n is the order of the m-sequence, and the captured image contains K bits of I $b=(b_0\ b_1\ b_2\ \ldots\ b_{K-1})^t$, where $K \geq n$ and the superscript t represents a transpose of the matrix or vector. The location s of the K bits is just the number of cyclic shifts of I so that $b_0$ is shifted to the beginning of the sequence. Then this shifted sequence R corresponds to the power series $x^s/P_n(x)$, or $R=T_s(I)$, where T is the cyclic shift operator. We find this s indirectly. The polynomials modulo $P_n(x)$ form a field. It is guaranteed that $x^s \equiv r_0 + r_1 x + \ldots r_{n-1} x^{n-1} \bmod(P_n(x))$. Therefore, we may find $(r_0, r_1, \ldots, r_{n-1})$ and then solve for s.

The relationship $x^s \equiv r_0 + r_1 x + \ldots r_{n-1} x^{n-1} \bmod(P_n(x))$ implies that $R=r_0 + r_1 T(I) + \ldots + r_{n-1} T^{n-1}(I)$. Written in a binary linear equation, it becomes:

$$R = r^t A \quad (2)$$

where $r=(r_0\ r_1\ r_2 \ldots r_{n-1})^t$, and $A=(I\ T(I) \ldots T^{n-1}(I))^t$ which consists of the cyclic shifts of I from 0-shift to (n−1)-shift. Now only sparse K bits are available in R to solve r. Let the index differences between $b_i$ and $b_0$ in R be $k_i$, i=1,2, ..., k−1, then the $1^{st}$ and $(k_i+1)$-th elements of R, i=1,2, ..., k−1, are exactly $b_0, b_1, \ldots, b_{k-1}$. By selecting the $1^{st}$ and $(k_i+1)$-th columns of A, i=1,2, ..., k−1, the following binary linear equation is formed:

$$b^t = r^t M \quad (3)$$

where M is an n×K sub-matrix of A.

If b is error-free, the solution of r may be expressed as:

$$r^t = \tilde{b}^t \tilde{M}^{-1} \quad (4)$$

where $\tilde{M}$ is any non-degenerate n×n sub-matrix of M and $\tilde{b}$ is the corresponding sub-vector of b.

With known r, we may use the Pohlig-Hellman-Silver algorithm as noted by Douglas W. Clark and Lih-Jyh Weng, "Maximal and Near-Maximal Shift Register Sequences: Efficient Event Counters and Easy Discrete Logarithms," IEEE Transactions on Computers 43.5 (May 1994, pp 560-568) to find s so that $x^s \equiv r_0 + r_1 x + \ldots r_{n-1} x^{n-1} \bmod(P_n(x))$.

As matrix A (with the size of n by L, where $L=2^n-1$) may be huge, we should avoid storing the entire matrix A. In fact, as we have seen in the above process, given extracted bits with index difference $k_i$, only the first and $(k_i+1)$-th columns of A are relevant to the computation. Such choices of $k_i$ is quite limited, given the size of the captured image. Thus, only those columns that may be involved in computation need to saved. The total number of such columns is much smaller than L (where $L=2^n-1$ is the length of the m-sequence).

Error Correction

If errors exist in b, then the solution of r becomes more complex. Traditional methods of decoding with error correction may not readily apply, because the matrix M associated with the captured bits may change from one captured image to another.

We adopt a stochastic approach. Assuming that the number of error bits in b, $n_e$, is relatively small compared to K, then the probability of choosing correct n bits from the K bits of b and the corresponding sub-matrix $\tilde{M}$ of M being non-degenerate is high.

When the n bits chosen are all correct, the Hamming distance between $b^t$ and $r^t M$, or the number of error bits associated with r, should be minimal, where r is computed via equation (4). Repeating the process for several times, it is likely that the correct r that results in the minimal error bits can be identified.

If there is only one r that is associated with the minimum number of error bits, then it is regarded as the correct solution. Otherwise, if there is more than one r that is associated with the minimum number of error bits, the probability that $n_e$ exceeds the error correcting ability of the code generated by M is high and the decoding process fails. The system then may move on to process the next captured image. In another implementation, information about previous locations of the pen can be taken into consideration. That is, for each captured image, a destination area where the pen may be expected next can be identified. For example, if the user has not lifted the pen between two image captures by the camera, the location of the pen as determined by the second image capture should not be too far away from the first location. Each r that is associated with the minimum number of error bits can then be checked to see if the location s computed from r satisfies the local constraint, i.e., whether the location is within the destination area specified.

If the location s satisfies the local constraint, the X, Y positions of the extracted bits in the array are returned. If not, the decoding process fails.

Figure 8:
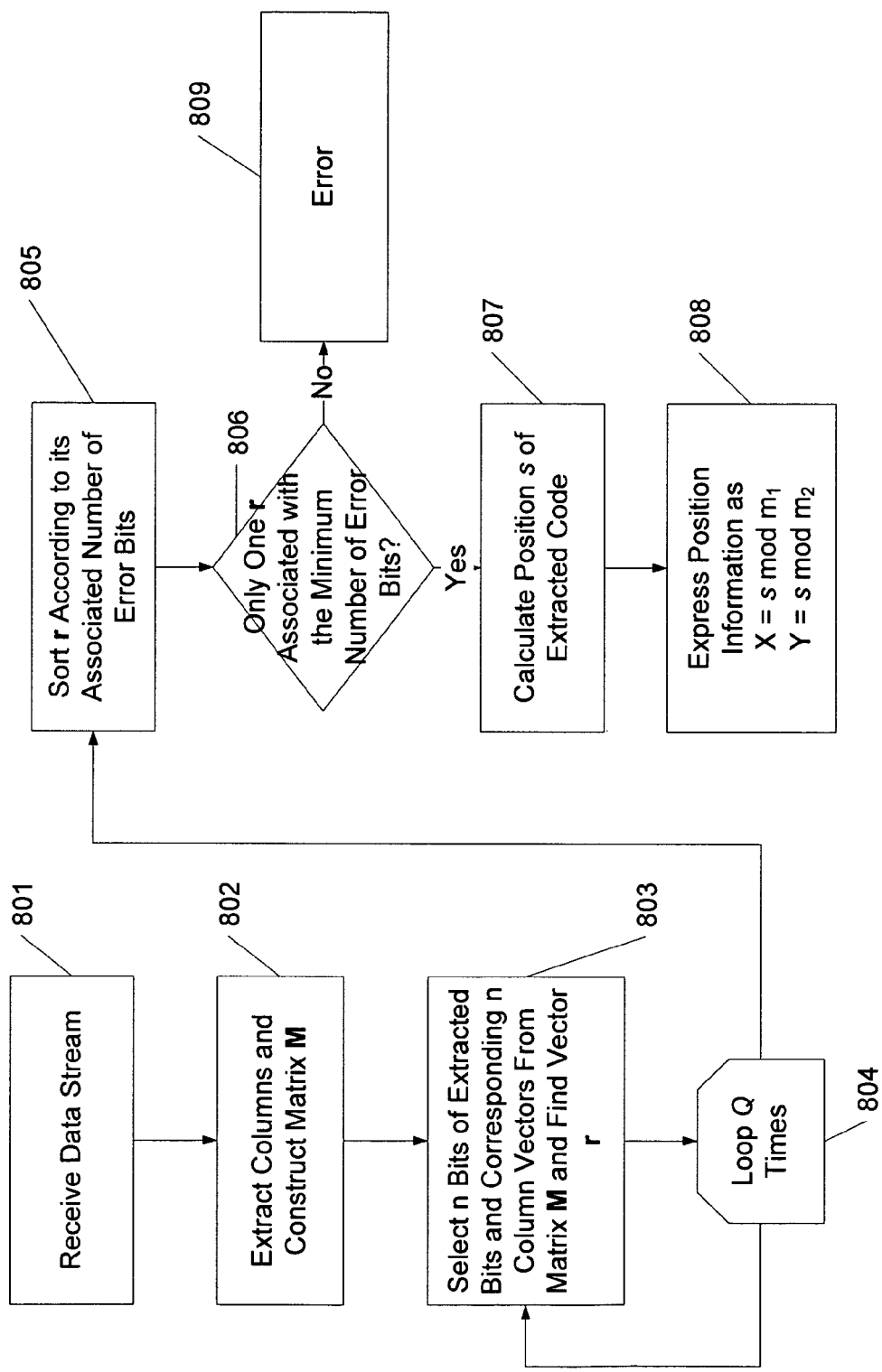
FIG. 8 shows a process for determining the location of a captured array in accordance with embodiments of the present invention.

FIG. 8 depicts a process that may be used to determine a location in a sequence (or m-sequence) of a captured image. First, in step 801, a data stream relating to a captured image is received. In step 802, corresponding columns are extracted from A and a matrix M is constructed.

In step 803, n independent column vectors are randomly selected from the matrix M and vector r is determined by solving equation (4). This process is performed Q times (for example, 100 times) in step 804. The determination of the number of loop times is discussed in the section Loop Times Calculation.

In step 805, r is sorted according to its associated number of error bits. The sorting can be done using a variety of sorting algorithms as known in the art. For example, a selection sorting algorithm may be used. The selection sorting algorithm is beneficial when the number Q is not large. However, if Q becomes large, other sorting algorithms (for example, a merge sort) that handle larger numbers of items more efficiently may be used.

The system then determines in step 806 whether error correction was performed successfully, by checking whether multiple r's are associated with the minimum number of error bits. If yes, an error is returned in step 809, indicating the decoding process failed. If not, the position s of the extracted bits in the sequence (or m-sequence) is calculated in step 807, for example, by using the Pohig-Hellman-Silver algorithm.

Next, the (X,Y) position in the array is calculated as: x=s mod $m_1$ and y=s mod $m_2$ and the results are returned in step 808.

Location Determination

Figure 9:
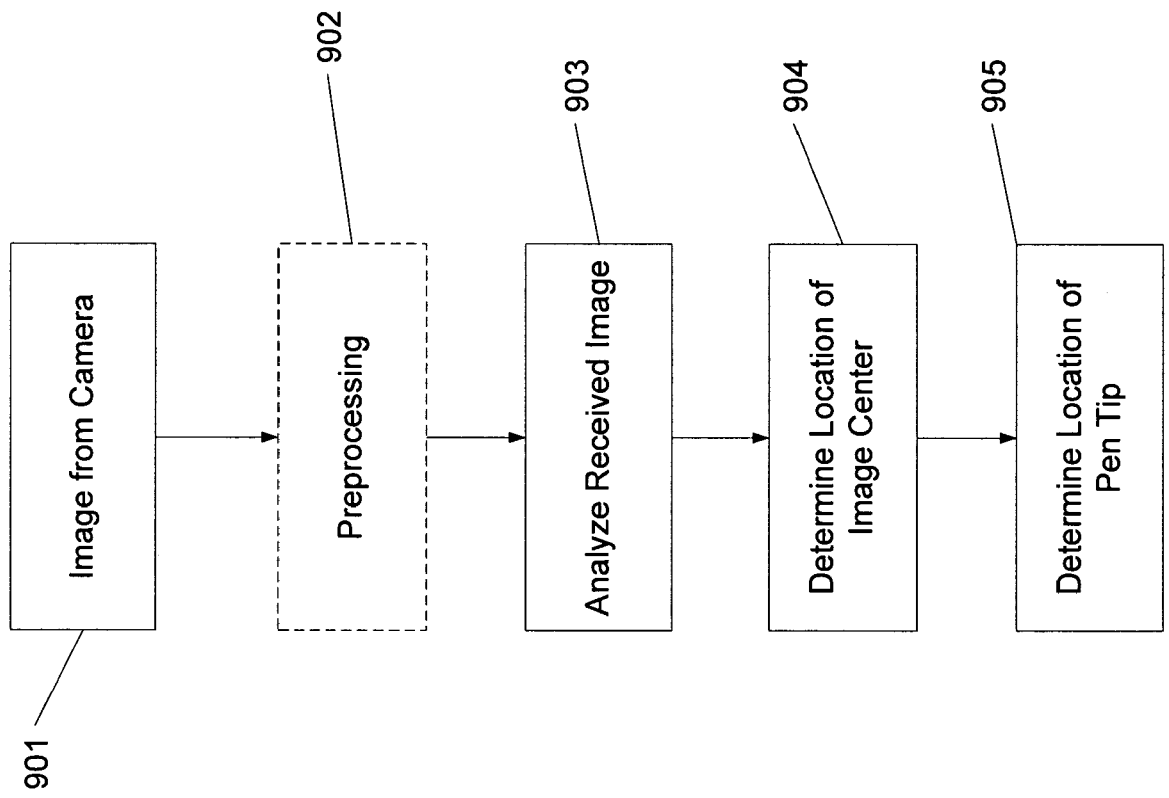
FIG. 9 shows a method for determining the location of a captured image in accordance with embodiments of the present invention.

FIG. 9 shows a process for determining the location of a pen tip. The input is an image captured by a camera and the output may be a position coordinates of the pen tip. Also, the output may include (or not) other information such as a rotation angle of the captured image.

In step 901, an image is received from a camera. Next, the received image may be optionally preprocessed in step 902 (as shown by the broken outline of step 902) to adjust the contrast between the light and dark pixels and the like.

Next, in step 903, the image is analyzed to determine the bit stream within it.

Next, in step 904, n bits are randomly selected from the bit stream for multiple times and the location of the received bit stream within the original sequence (or m-sequence) is determined.

Finally, once the location of the captured image is determined in step 904, the location of the pen tip may be determined in step 905.

Figure 10:
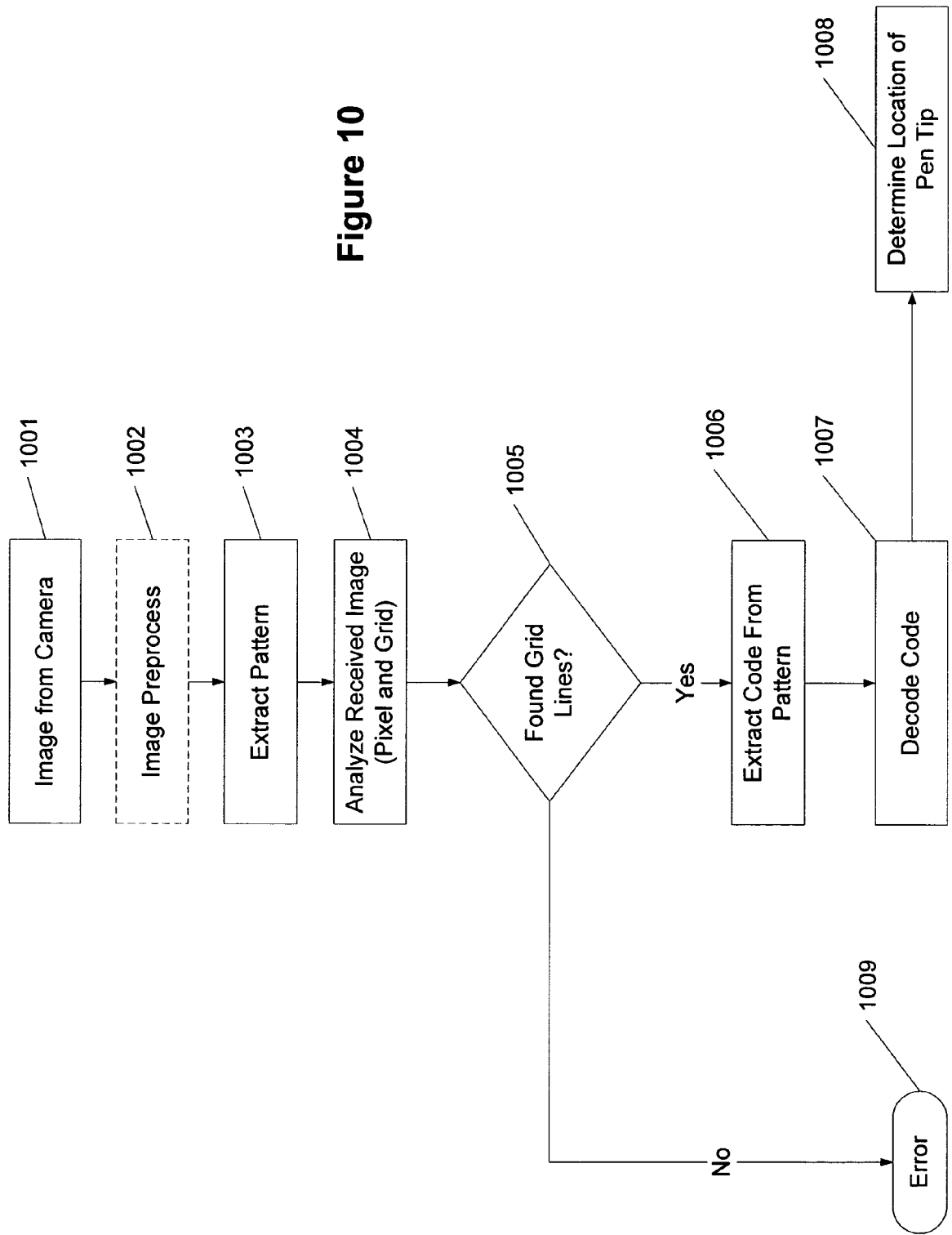
FIG. 10 shows another method for determining the location of captured image in accordance with embodiments of the present invention.

FIG. 10 gives more details about 903 and 904 and shows the approach to extract the bit stream within a captured image. First, an image is received from the camera in step 1001. The image then may optionally undergo image preprocessing in step 1002 (as shown by the broken outline of step 1002). The pattern is extracted in step 1003. Here, pixels on the various lines may be extracted to find the orientation of the pattern and the angle θ.

Next, the received image is analyzed in step 1004 to determine the underlying grid lines. If grid lines are found in step 1005, then the code is extracted from the pattern in step 1006. The code is then decoded in step 1007 and the location of the pen tip is determined in step 1008. If no grid lines were found in step 1005, then an error is returned in step 1009.

Outline of Enhanced Decoding and Error Correction Algorithm

Figure 12:
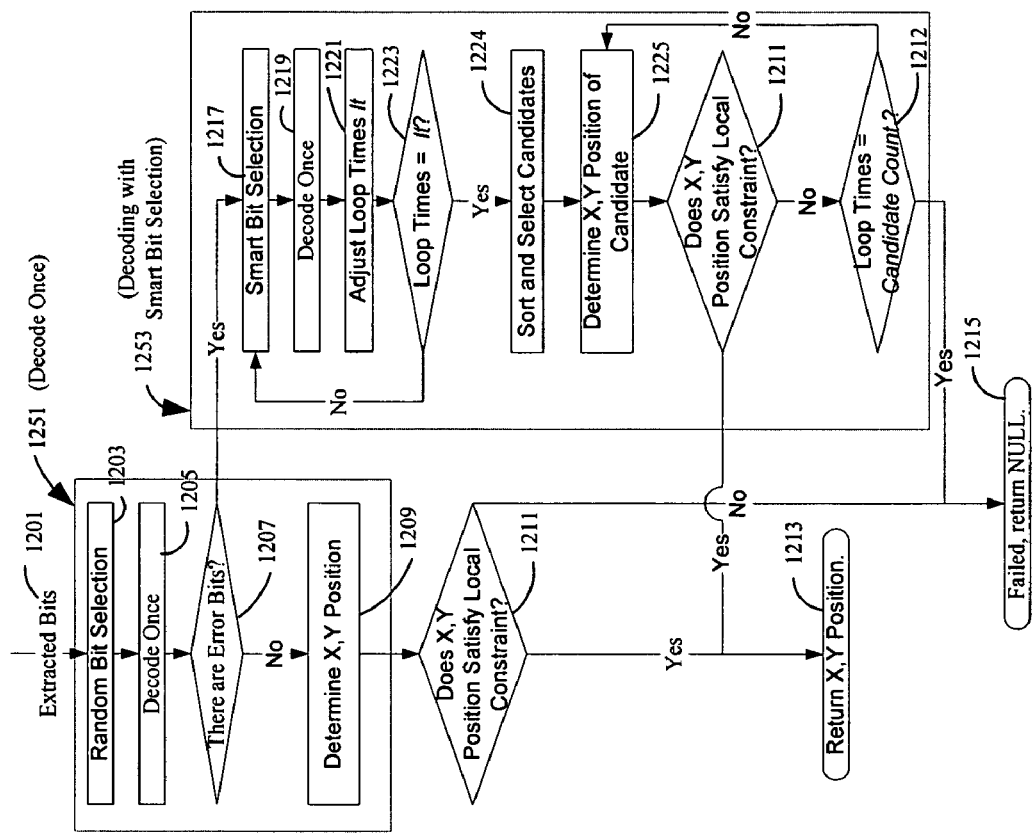
FIG. 12 shows a flow diagram for decoding extracted bits from a captured image in accordance with embodiments of the present invention.

With an embodiment of the invention as shown in FIG. 12, given extracted bits 1201 from a captured image (corresponding to a captured array) and the destination area, a variation of an m-array decoding and error correction process decodes the X,Y position. FIG. 12 shows a flow diagram of process 1200 of this enhanced approach. Process 1200 comprises two components 1251 and 1253.

Decode Once. Component 1251 includes three parts.
  random bit selection: randomly selects a subset of the extracted bits 1201 (step 1203)
  decode the subset (step 1205)
  determine X,Y position with local constraint (step 1209)
Decoding with Smart Bit Selection. Component 1253 includes four parts.
  smart bit selection: selects another subset of the extracted bits (step 1217)
  decode the subset (step 1219)
  adjust the number of iterations (loop times) of step 1217 and step 1219 (step 1221)
  determine X,Y position with local constraint (step 1225)

The embodiment of the invention utilizes a discreet strategy to select bits, adjusts the number of loop iterations, and determines the X,Y position (location coordinates) in accordance with a local constraint, which is provided to process 1200. With both components 1251 and 1253, steps 1205 and 1219 ("Decode Once") utilize equation (4) to compute r.

Let $b$ be decoded bits, that is:

$$b^t = r^t M \quad (5)$$

The difference between b and $b$ are the error bits associated with r.

FIG. 12 shows a flow diagram of process 1200 for decoding extracted bits 1201 from a captured image in accordance with embodiments of the present invention. Process 1200 comprises components 1251 and 1253. Component 1251 obtains extracted bits 1201 (comprising K bits) associated with a captured image (corresponding to a captured array). In step 1203, n bits (where n is the order of the m-array) are randomly selected from extracted bits 1201. In step 1205, process 1200 decodes once and calculates r. In step 1207, process 1200 determines if error bits are detected for b. If step 1207 determines that there are no error bits, X,Y coordinates of the position of the captured array are determined in step 1209. With step 1211, if the X,Y coordinates satisfy the local constraint, i.e., coordinates that are within the destination area, process 1200 provides the X,Y position (such as to another process or user interface) in step 1213. Otherwise, step 1215 provides a failure indication.

If step 1207 detects error bits in b, component 1253 is executed in order to decode with error bits. Step 1217 selects another set of n bits (which differ by at least one bit from the n bits selected in step 1203) from extracted bits 1201. Steps 1221 and 1223 determine the number of iterations (loop times) that are necessary for decoding the extracted bits. Step 1225 determines the position of the captured array by testing which candidates obtained in step 1219 satisfy the local constraint. Steps 1217-1225 will be discussed in more details.

Smart Bit Selection

Step 1203 randomly selects n bits from extracted bits 1201 (having K bits), and solves for $r_1$. Using equation (5), decoded bits can be calculated. Let $I_1 = \{k \in \{1, 2, \ldots, K\} | b_k = \hat{b}_k\}$, $\bar{I} = \{k \in \{1, 2, \ldots, K\} | b_k \neq \hat{b}_k\}$, where $\hat{b}_k$ is the $k^{th}$ bit of $\hat{b}$, $B_1 = \{b_k | k \in I_1\}$ and $\bar{B}_1 = \{b_k | k \in \bar{I}_1\}$, that is, $B_1$ are bits that the decoded results are the same as the original bits, and $\bar{B}_1$ are bits that the decoded results are different from the original bits, $I_1$ and $\bar{I}_1$ are the corresponding indices of these bits. It is appreciated that the same $r_1$ will be obtained when any n bits are selected from $B_1$. Therefore, if the next n bits are not carefully chosen, it is possible that the selected bits are a subset of $B_1$, thus resulting in the same $r_1$ being obtained.

Figure 13:
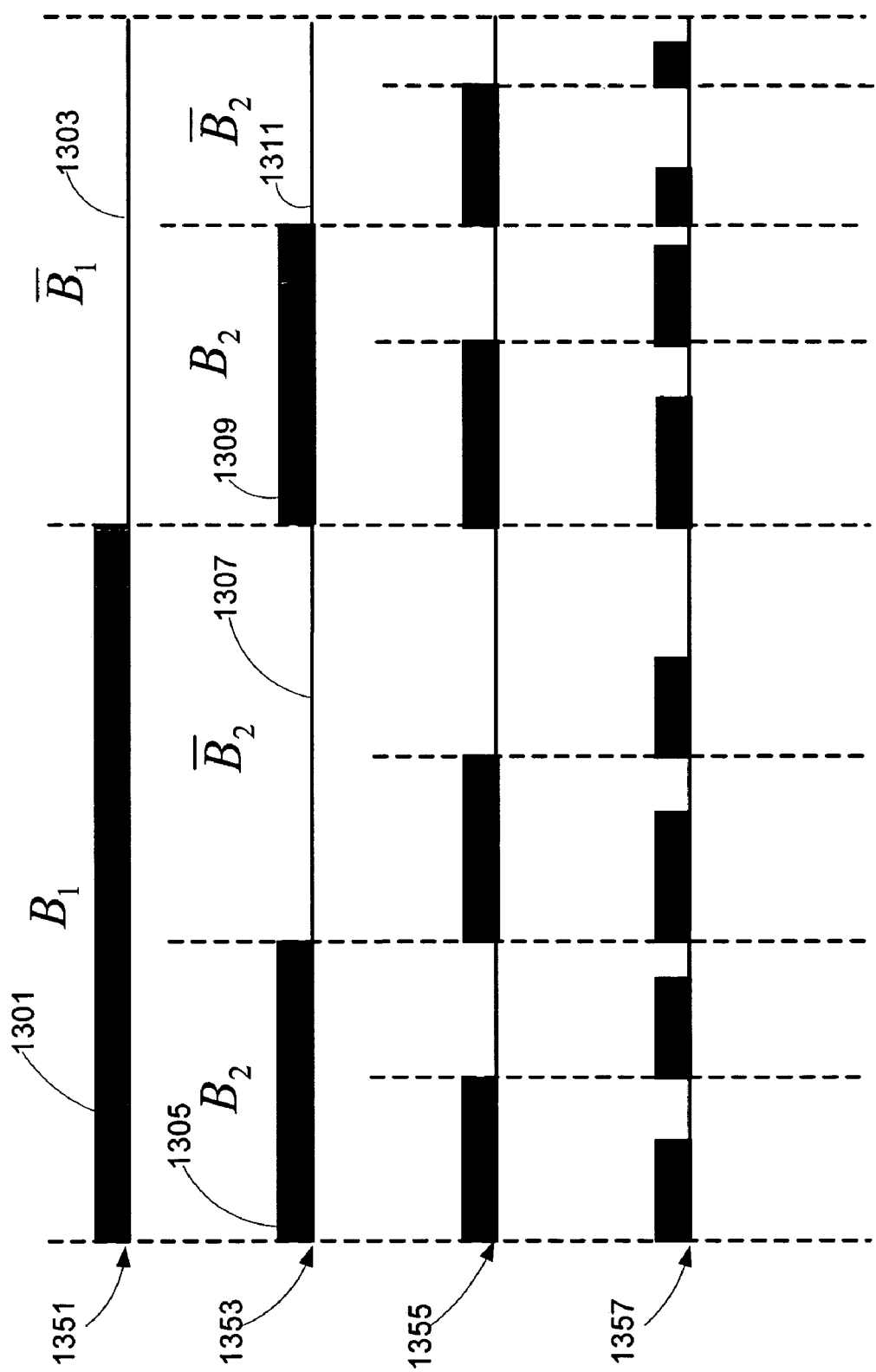
FIG. 13 shows bit selection of extracted bits from a captured image in accordance with embodiments of the present invention.

In order to avoid such a situation, step 1217 selects the next n bits according to the following procedure:

1. Choose at least one bit from $\bar{B}_1$ 1303 and the rest of the bits randomly from $B_1$ 1301 and $\bar{B}_1$ 1303, as shown in FIG. 13 corresponding to bit arrangement 1351. Process 1200 then solves $r_2$ and finds $B_2$ 1305, 1309 and $\bar{B}_2$ 1307, 1311 by computing $\hat{b}_2{}^t = r_2{}^t M_2$.
2. Repeat step 1. When selecting the next n bits, for every $\bar{B}_i$ (i=1, 2, 3 . . . , x−1, where x is the current loop number), there is at least one bit selected from $\bar{B}_i$. The iteration terminates when no such subset of bits can be selected or when the loop times are reached.

Loop Times Calculation

With the error correction component 1253, the number of required iterations (loop times) is adjusted after each loop. The loop times is determined by the expected error rate. The expected error rate $p_e$ in which not all the selected n bits are correct is:

$$p_e = \left(1 - \frac{C_{K-n_e}^n}{C_K^n}\right)^{lt} \approx -e^{-lt\left(\frac{K-n_e}{K}\right)^{n_e}} \quad (6)$$

where lt represents the loop times and is initialized by a constant, K is the number of extracted bits from the captured array, $n_e$ represents the minimum number of error bits incurred during the iteration of process 1200, n is the order of the m-array, and $C_K^n$ is the number of combinations in which n bits are selected from K bits.

In the embodiment, we want $p_e$ to be less than $e^{-5}=0.0067$. In combination with (6), we have:

$$lt_i = \min\left(lt_{i-1}, \frac{5}{\left(\frac{K-n}{K}\right)^{n_e}} + 1\right) \quad (7)$$

Adjusting the loop times may significantly reduce the number of iterations of process 1253 that are required for error correction.

Determine X, Y Position with Local Constraint

In steps 1209 and 1225, the decoded position should be within the destination area. The destination area is an input to the algorithm, and it may be of various sizes and places or simply the whole m-array depending on different applications. Usually it can be predicted by the application. For example, if the previous position is determined, considering the writing speed, the destination area of the current pen tip should be close to the previous position. However, if the pen is lifted, then its next position can be anywhere. Therefore, in this case, the destination area should be the whole m-array. The correct X,Y position is determined by the following steps.

In step 1224 process 1200 selects $r_i$ whose corresponding number of error bits is less than:

$$N_e = \frac{\log_{10}\left(\frac{3}{lt}\right)}{\log_{10}\left(\frac{K-n}{K}\right) \times \log_{10}\left(\frac{10}{lr}\right)} \quad (8)$$

where lt is the actual loop times and lr represents the Local Constraint Rate calculated by:

$$lr = \frac{\text{area of the destination area}}{L} \quad (9)$$

where L is the length of the m-array.

Step 1224 sorts $r_i$ in ascending order of the number of error bits. Steps 1225, 1211 and 1212 then finds the first $r_i$ in which the corresponding X,Y position is within the destination area. Steps 1225, 1211 and 1212 finally returns the X,Y position as the result (through step 1213), or an indication that the decoding procedure failed (through step 1215).

Illustrative Example of Enhanced Decoding and Error Correction Process

An illustrative example demonstrates process 1200 as performed by components 1251 and 1253. Suppose n=3, K=5, $I=(I_0 \; I_1 \ldots I_6)^t$ is the m-sequence of order n=3. Then $$A = \begin{pmatrix} I_0 & I_1 & I_2 & I_3 & I_4 & I_5 & I_6 \\ I_6 & I_0 & I_1 & I_2 & I_3 & I_4 & I_5 \\ I_5 & I_6 & I_0 & I_1 & I_2 & I_3 & I_4 \end{pmatrix} \quad (10)$$

Also suppose that the extracted bits $b=(b_0 \; b_1 \; b_2 \; b_3 \; b_4)^t$, where K=5, are actually the $s^{th}$, $(s+1)^{th}$, $(s+3)^{th}$, $(s+4)^{th}$, and $(s+6)^{th}$ bits of the m-sequence (these numbers are actually modulus of the m-array length $L=2^n-1=2^3-1=7$). Therefore $$M = \begin{pmatrix} I_0 & I_1 & I_3 & I_4 & I_6 \\ I_6 & I_0 & I_2 & I_3 & I_5 \\ I_5 & I_6 & I_1 & I_2 & I_4 \end{pmatrix} \quad (11)$$

which consists of the $0^{th}$, $1^{st}$, $3^{rd}$, $4^{th}$, and $6^{th}$ columns of A. The number s, which uniquely determines the X,Y position of $b_0$ in the m-array, can be computed after solving $r=(r_0 \; r_1 \; r_2)^t$ that are expected to fulfill $b^t = r^t M$. Due to possible error bits in b, $b^t = r^t M$ may not be completely fulfilled.

Process 1200 utilizes the following procedure. Randomly select n=3 bits, say $\tilde{b}_1^t = (b_0 \; b_1 \; b_2)$, from b. Solving for $r_1$:

$$\tilde{b}_1^t = r_1^t \tilde{M}_1 \quad (12)$$

where $\tilde{M}_1$ consists of the 0th, 1st, and 2nd columns of M. (Note that $\tilde{M}_1$ is an n×n matrix and $r_1^t$ is a 1×n vector so that $\tilde{b}_1^t$ is a 1×n vector of selected bits.)

Next, decoded bits are computed:

$$b_1^t = r_1^t M \quad (13)$$

where M is an n×K matrix and $r_1^t$ is a 1×n vector so that $b_1^t$, is a 1×K vector. If $b_1$ is identical to b, i.e., no error bits are detected, then step 1209 determines the X,Y position and step 1211 determines whether the decoded position is inside the destination area. If so, the decoding is successful, and step 1213 is performed. Otherwise, the decoding fails as indicated by step 1215. If $b_1$ is different from b, then error bits in b are detected and component 1253 is performed. Step 1217 determines the set $B_1$, say $\{b_0 \; b_1 \; b_2 \; b_3\}$, where the decoded bits are the same as the original bits. Thus, $\overline{B}_1 = \{b_4\}$ (corresponding to bit arrangement 1351 in FIG. 13). Loop times (lt) is initialized to a constant, e.g., 100, which may be variable depending on the application. Note that the number of error bits corresponding to $r_1$ is equal to 1. Then step 1221 updates the loop time (lt) according to equation (7), $lt_1 = \min(lt, 13) = 13$.

Step 1217 next chooses another n=3 bits from b. If the bits all belong to $B_1$, say $\{b_0 \; b_2 \; b_3\}$, then step 1219 will determine $r_1$ again. In order to avoid such repetition, step 1217 may select, for example, one bit $\{b_4\}$ from $\overline{B}_1$, and the remaining two bits $\{b_0 \; b_1\}$ from $B_1$.

The selected three bits form $\tilde{b}_2^t = (b_0 \; b_1 \; b_4)$. Step 1219 solves for $r_2$:

$$\tilde{b}_2^t = r_2^t \tilde{M}_2 \quad (14)$$

where $\tilde{M}_2$ consists of the $0^{th}$, $1^{st}$, and $4^{th}$ columns of M.

Step 1219 computes $b_2^t = r_2^t M$. Find the set $B_2$, e.g., $\{b_0 \; b_1 \; b_4\}$ such that $b_2$ and b are the same. Then $\overline{B}_2 = \{b_2 \; b_3\}$ (corresponding to bit arrangement 1353 in FIG. 13). Step 1221 updates the loop times (lt) according to equation (7).

Note that the number of error bits associated with $r_2$ is equal to 2. Substituting into (7), $lt_2=\min(lt_1,32)=13$.

Because another iteration needs to be performed, step 1217 chooses another n=3 bits from b. The selected bits shall not all belong to either $B_1$ or $B_2$. So step 1217 may select, for example, one bit $\{b_4\}$ from $\overline{B}_1$, one bit $\{b_2\}$ from $\overline{B}_2$, and the remaining one bit $\{b_0\}$.

The solution of r, bit selection, and loop times adjustment continues until we cannot select any new n=3 bits such that they do not all belong to any previous $B_i$'s, or the maximum loop times lt is reached.

Suppose that process 1200 calculates five $r_i$ (i=1,2,3,4,5), with the number of error bits corresponding to 1, 2, 4, 3, 2, respectively. (Actually, for this example, the number of error bits cannot exceed 2, but the illustrative example shows a larger number of error bits to illustrate the algorithm.) Step 1224 selects $r_i$'s, for example, $r_1$, $r_2$, $r_4$, $r_5$, whose corresponding numbers of error bits are less than $N_e$ shown in (8).

Step 1224 sorts the selected vectors $r_1$, $r_2$, $r_4$, $r_5$ in ascending order of their error bit numbers: $r_1$, $r_2$, $r_5$, $r_4$. From the sorted candidate list, steps 1225, 1211 and 1212 find the first vector r, for example, $r_5$, whose corresponding position is within the destination area. Step 1213 then outputs the corresponding position. If none of the positions is within the destination area, the decoding process fails as indicated by step 1215.

Apparatus

Figure 14:
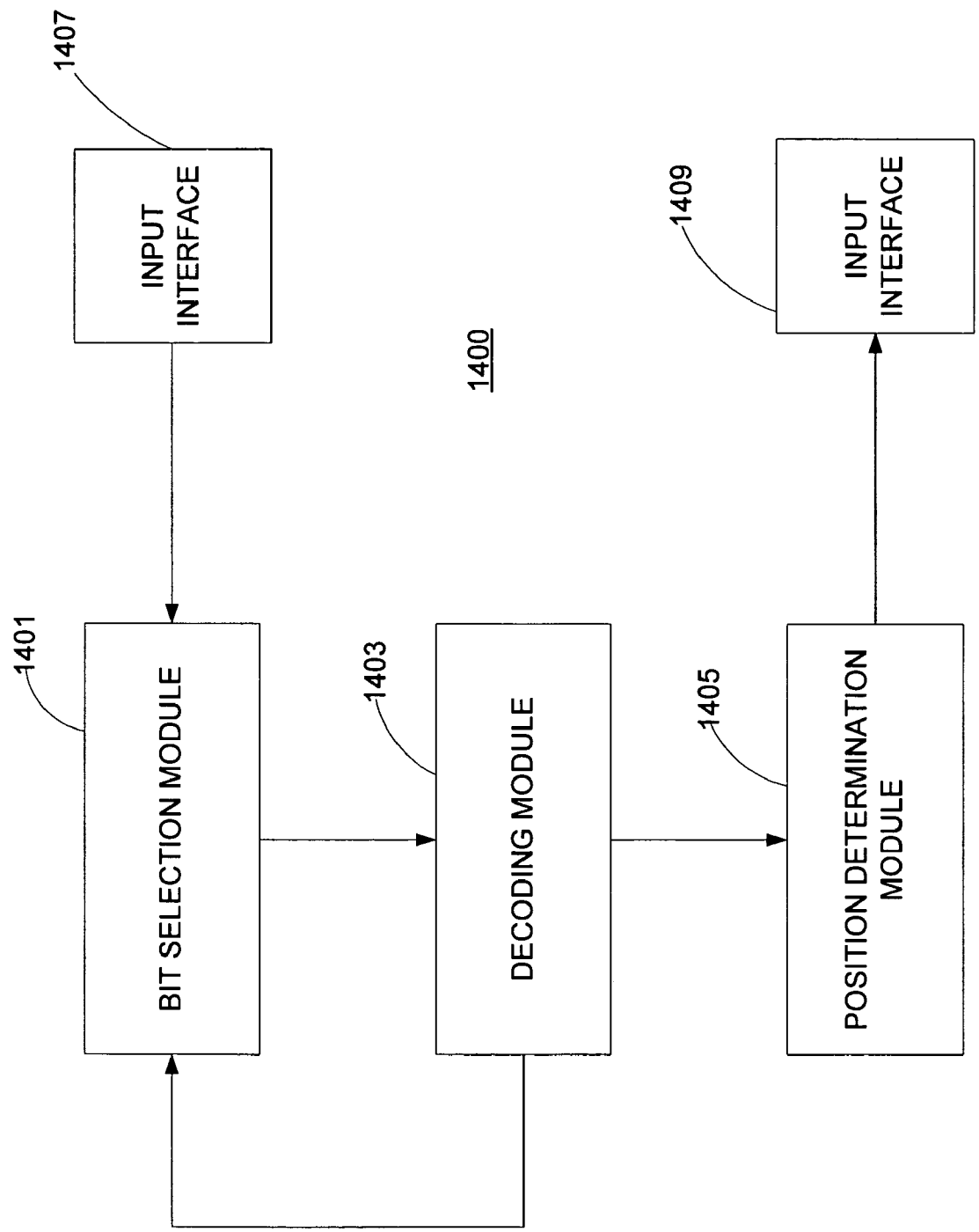
FIG. 14 shows an apparatus for decoding extracted bits from a captured image in accordance with embodiments of the present invention.

FIG. 14 shows an apparatus 1400 for decoding extracted bits 1201 from a captured array in accordance with embodiments of the present invention. Apparatus 1400 comprises bit selection module 1401, decoding module 1403, position determination module 1405, input interface 1407, and output interface 1409. In the embodiment, interface 1407 may receive extracted bits 1201 from different sources, including a module that supports camera 203 (as shown in FIG. 2A). Bit selection module 1401 selects n bits from extracted bits 1201 in accordance with steps 1203 and 1217. Decoding module 1403 decodes the selected bits (n bits selected from the K extracted bits as selected by bit selection module 1401) to determine detected bit errors and corresponding vectors $r_i$ in accordance with steps 1205 and 1219. Decoding module 1403 presents the determined vectors $r_i$ to position determination module 1405. Position determination module 1405 determines the X,Y coordinates of the captured array in accordance with steps 1209 and 1225. Position determination module 1405 presents the results, which includes the X,Y coordinates if successful and an error indication if not successful, to output interface 1409. Output interface 1409 may present the results to another module that may perform further processing or that may display the results.

Maze Pattern Analysis

Figure 15:
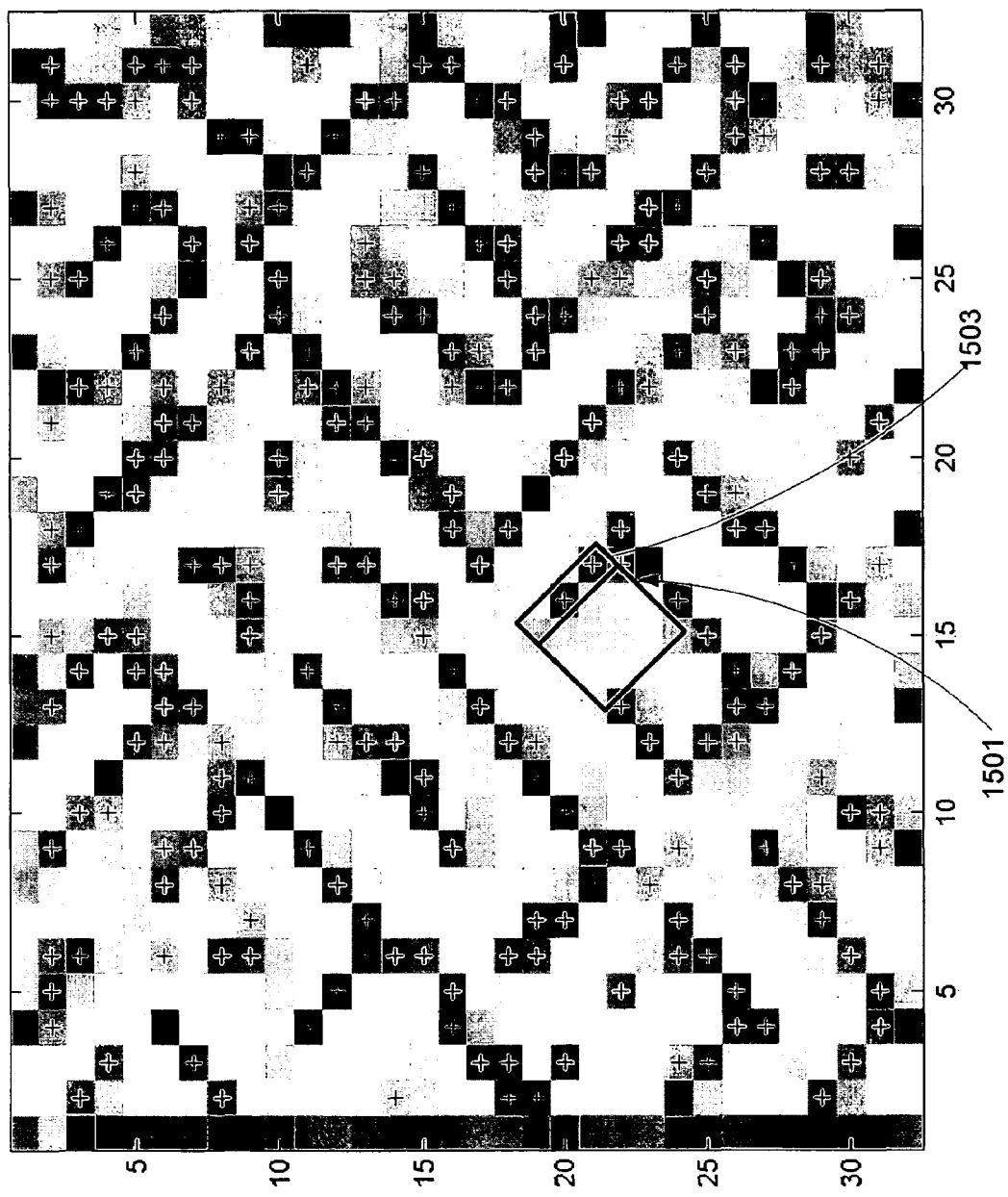
FIG. 15 shows an exemplary image of a maze pattern that illustrates a maze pattern cell with an associated maze pattern bar in accordance with embodiments of the invention.

FIG. 15 shows an exemplary image of a maze pattern 1500 that illustrates maze pattern cell 1501 with an associated maze pattern bar 1503 in accordance with embodiments of the invention. Maze pattern 1500 contains maze pattern bars, e.g., 1503. Effective pixels (EPs) are pixels that are most likely to be located on the maze pattern bars as shown in FIG. 15. In an embodiment, the ratio (r) of the pixels on maze pattern bars can be approximated by calculating the area of a maze pattern bar divided by the area of a maze pattern cell. For example, if the maze pattern cell size is 3.2×3.2 pixel and the bar size is 3.2×1 pixel, then r=1/3.2. For an image without document content captured by a 32×32 pixel camera, the number of effective pixels is approximately 32×32×(1/3.2)=320. Consequently, one estimates 320 effective pixels in the image. Since the effective pixels tend to be darker, 320 pixels with lower gray level values are selected. (In the embodiment, a lower gray level value corresponds to a darker pixel. For example, a gray level value equal to '0' corresponds to a darkest pixel and a gray level value equal to '255' corresponds to a lightest pixel.) FIG. 15 shows separated effective pixels of an example image corresponding to maze pattern 1500. If document content is captured, then the number of effective pixels is estimated as (32*32−n)×(1/3.2), where n is the number of pixels which lie on document content area.

Figure 16:
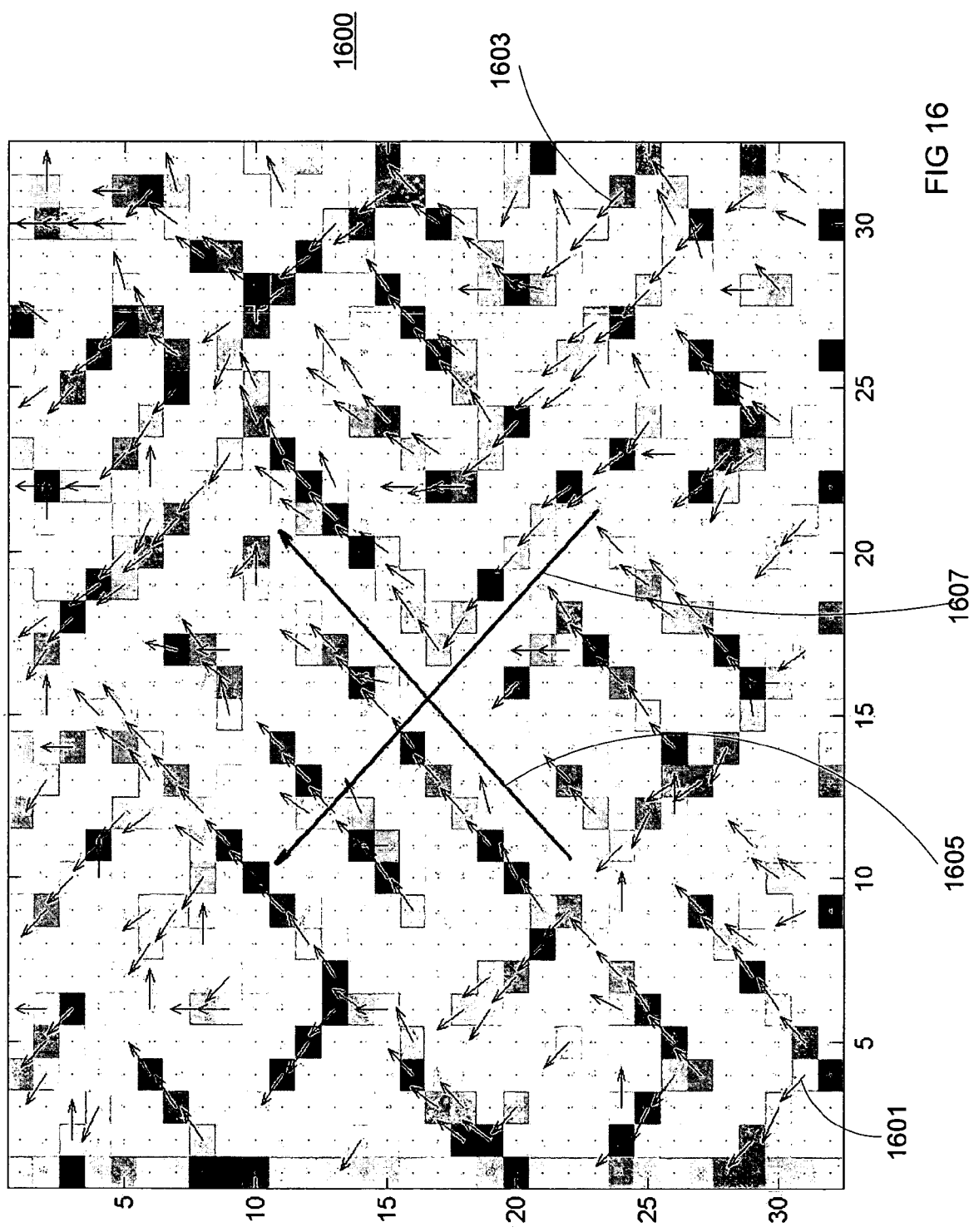
FIG. 16 shows an exemplary image of a maze pattern that illustrates estimated directions for the effective pixels in accordance with embodiments of the invention.

FIG. 16 shows an exemplary image of maze pattern 1600 that illustrates estimated directions for the effective pixels in accordance with embodiments of the invention. In FIG. 16 an estimated direction (e.g., estimated directions 1601 or 1603) is associated with each effective pixel. A histogram of all estimated directions is formed. From the histogram, two directions that are about 90 degrees apart (for example, they may be 80, 90 or 100 degrees apart) and occurred the most often (sum of their frequencies is the maximum among all pairs of directions that are 80, 90, or 100 degrees apart) are chosen as the initial centers of two clusters of estimated directions. All effective pixels are clustered into the two clusters based on whether their estimated directions are closer to the center of the first cluster or to the center of the second cluster. The distance between the estimated direction and a center can be expressed as $\min(180-x-\text{center}|,|x-\text{center}|)$, where x is the estimated direction of an effective pixel and center is the center of a cluster. We then calculate the mean value of estimated directions of all effective pixels in each cluster and use the values as estimates of the two principal directions of the grid lines for further processing. Direction 1605 and direction 1607 correspond to the two principal directions of the grid lines.

Figure 17:
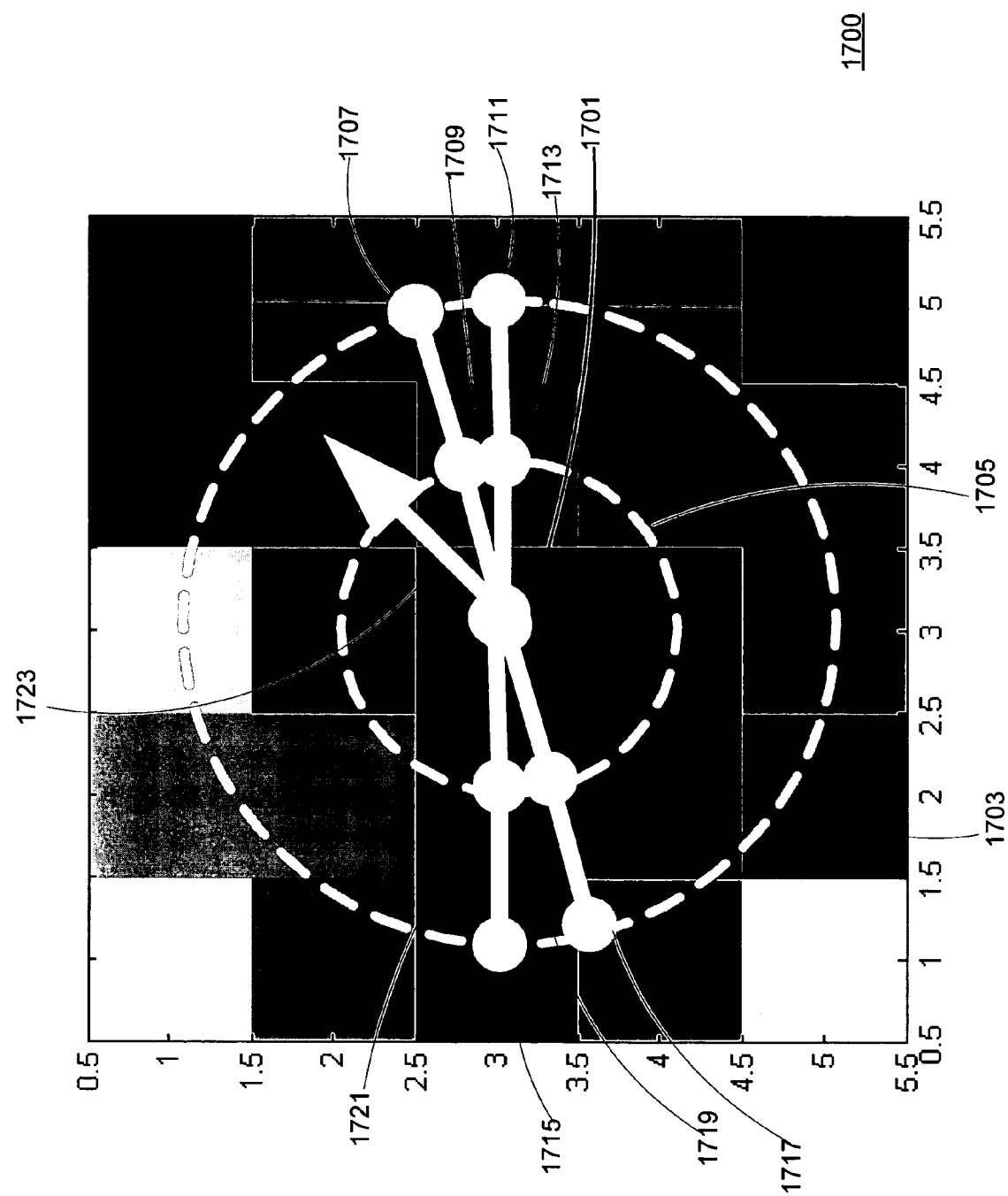
FIG. 17 shows an exemplary image of a portion of a maze pattern that illustrates estimating a direction for an effective pixel in accordance with embodiments of the invention.

FIG. 17 shows an exemplary image of a portion of maze pattern 1700 that illustrates estimating a direction for an effective pixel in accordance with embodiments of the invention. For each effective pixel (e.g., effective pixel 1701), one estimates the direction of the bar which passes the effective pixel. The mean gray level value for points 1711, 1713, 1721, and 1715 (represented as $A^+_0$, $B^+_0$, $A^-_0$, $B^-_0$ in the equation below) is calculated as:

$$S(\theta=0 \text{ degree})=(G(A^+_0)+G(B^+_0)+G(A^-_0)+G(B^-_0))/4 \quad (15)$$

where $G(\cdot)$ is the gray level value of a point. The mean gray level value for points 1707, 1709, 1719, and 1717 (represented as $A^+_1$, $B^+_1$, $A^-_1$, $B^-_1$ in the equation below) and $S(\theta=10 \text{ degree})$ is obtained in the same manner:

$$S(\theta=10 \text{ deg})=(G(A^+_1)+G(B^+_1)+G(A^-_1)+G(B^-_1))/4 \quad (16)$$

This process is repeated 18 times, from 0 degree, in 10 degree steps to 170 degree. The direction 1723 with lowest mean gray level value is selected as the estimated direction of effective pixel 1701. In other embodiments, the sampling angle interval may be less than 10 degrees to obtain a more precise estimate of the direction. The length of radius $PA^+_0$ 1705 and radius $PB^+_0$ 1703 are selected as 1 pixel and 2 pixels, respectively.

The x, y value of position of points used to estimate the direction may not be an integer, e.g., points $A^+_1$, $B^+_1$, $A^-_1$, and $B^-_1$. The gray level values of corresponding points may be obtained by bilinear sampling the gray level values of neighbor pixels. Bilinear sampling is expressed by:

$$G(x,y)=(1-y_d)\cdot[(1-x_d)\cdot G(x_1,y_1)+x_d\cdot G(x_1+1,y_1)+y_d\cdot[(1-x_d)\cdot G(x_1,y_1+1)+x_d\cdot G(x_1+1,y_1+1)] \quad (17)$$

where (x, y) is the position of a point, for a 32×32 pixel image sensor, $-0.5<=x<=31.5$, $-0.5<=y<=31.5$, and $x_1,y_1$ and $X_d, y_d$ are the integer parts and the decimal fraction parts of x, y, respectively. If x is less than 0, or greater than 31, or y is less than 0, or greater than 31, bilinear extrapolation is used. In such cases, Equation 17 is still applicable, except that $x_1$, $y_1$ should be 0 (when the value is less than 0) or 30 (when the value is greater than 31), and $x_d = x - x_1$, $y_d = y - y_1$.

Figure 18:
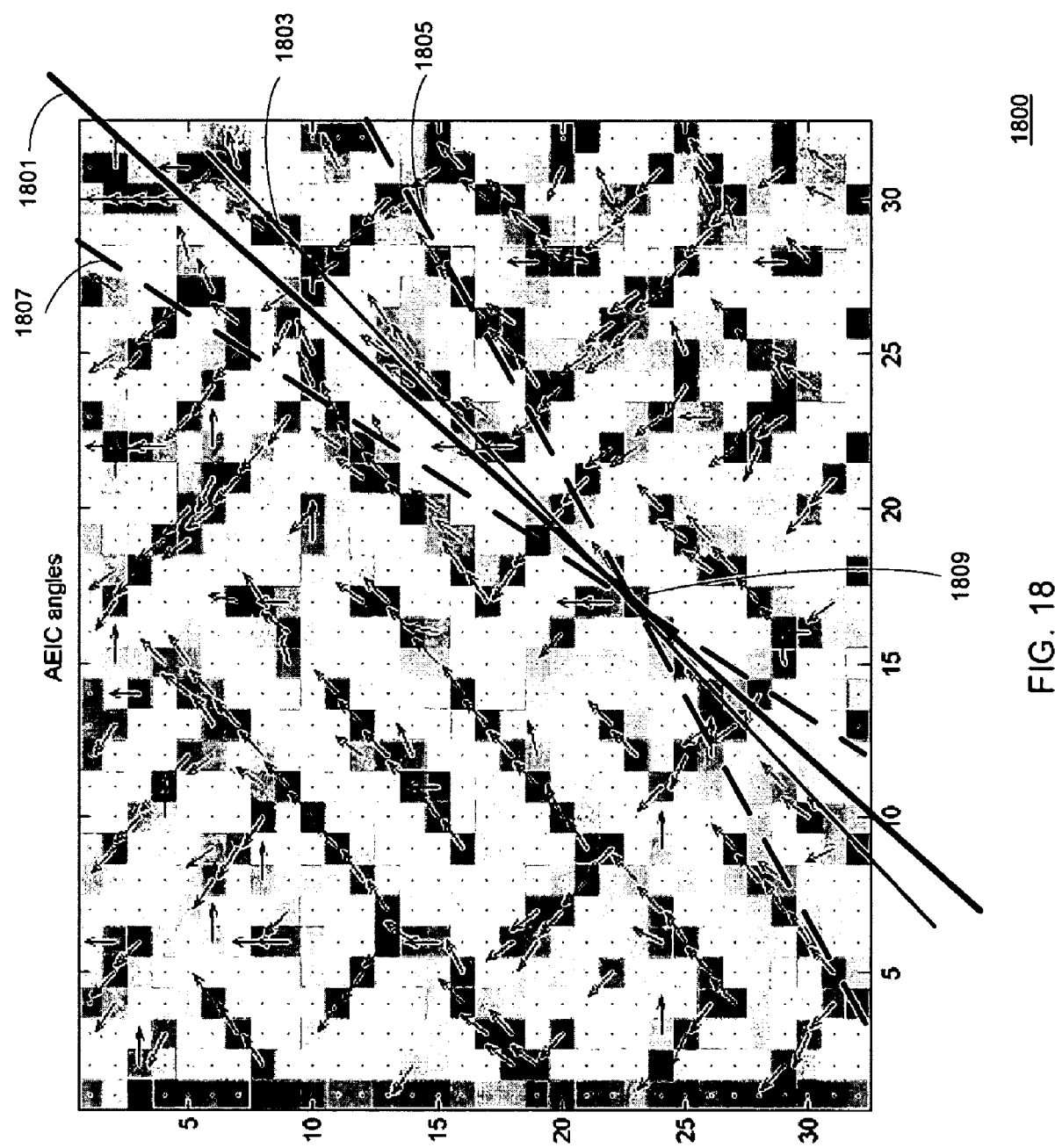
FIG. 18 shows an exemplary image of a maze pattern that illustrates calculating line parameters for a grid line that passes through a representative effective pixel in accordance with embodiments of the invention.

FIG. 18 shows an exemplary image of maze pattern 1800 that illustrates calculating line parameters for a grid line that passes through representative effective pixel 1809 in accordance with embodiments of the invention. One selects a cluster with more effective pixels and computes the line parameters in this direction because there is typically a larger error when estimating the principal direction with less effective pixels. By calculating the line parameters in the direction with more effective pixels, a more precise estimate of the principal direction with less effective pixels is obtained by using a perpendicular constraint of two directions. (In the embodiment, grid lines are associated with two nearly orthogonal sets of grid lines.) The approach is typically effective in a maze pattern with a text area.

In an embodiment, one calculates the line parameters for lines that pass through selected effective pixels. There are two rules to select effective pixels. First, the selected effective pixel must be darker than any other effective pixels that lie in 8 pixel neighborhood. Second, if one effective pixel is selected, the 24 neighbor pixels of the effective pixel should not be selected. (The 24 neighbors of pixel $(x_0, y_0)$ denotes any pixel with coordinates (x, y), and $|x-x_0| \leq 2$, and $|y-y_0| \leq 2$, where |·| means absolute value). For effective pixel 1809, a sector of interest area is determined based on the principal direction. The sector of interest is determined by vector 1805 and 1807, in which the angle between each vector and the principle direction 1801 is less than a constant angle, e.g., 10 degrees. Now, we use a robust regression algorithm to estimate the parameters of the line passing effective pixel 1809, i.e. line 1803 which can be expressed as $y = k \times x + b$, where parameters of the line include slope k and line offset b.

Step 1. All effective pixels which are in the cluster, and located in the sector of interest of effective pixel 1809, are incorporated to calculate the line parameters by using a least squares regression algorithm.

Step 2. The distance between each effective pixel used in regressing the line and the estimated line is calculated. If all these distances are less than a constant value, e.g. 0.5 pixels, the estimated line parameters are sufficiently good, and the regression process ends. Otherwise, the standard deviation of the distances is calculated.

Step 3. Effective pixels used in regressing the line whose distance to the estimated line is less than the standard deviation multiplied by a constant (for example 1.2) are chosen to estimate the line parameters again to obtain another estimate of the line parameters.

Step 4. The estimated line parameters are compared with the estimated parameters from the last iteration. If the difference is sufficiently small, i.e., $|k^{new} - k^{old}| \leq$ constant value (for example, 0.01), and $|b^{new} - b^{old}| \leq$ constant value (for example, 0.01), regression process ends. Otherwise, repeat the regression process, starting from Step 2.

This process iterates for a maximum of 10 times. If the line parameters obtained do not converge, i.e. do not satisfy the condition $|k^{new} - k^{old}| \leq$ constant value (for example, 0.01), and $|b^{new} - b^{old}| \leq$ constant value (for example, 0.01), regression fails for this effective pixel. We go on to the next effective pixel.

At the end of this process (of selecting effective pixels and obtaining the line passing through the effective pixel with regression), we obtain a set of grid lines that are independently obtained.

Figure 19:
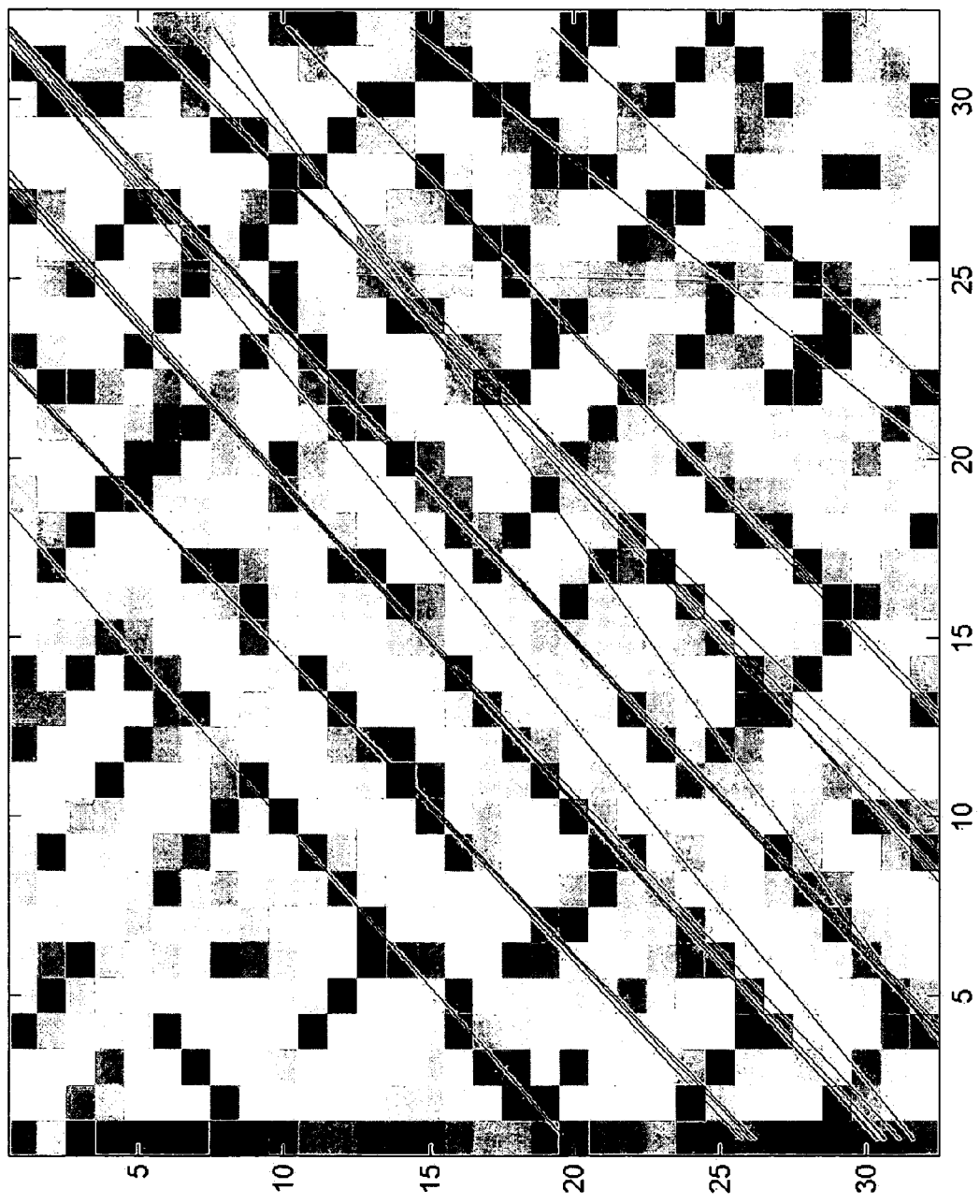
FIG. 19 shows an exemplary image of a maze pattern that illustrates estimated grid lines associated with a selected cluster in accordance with embodiments of the invention.

FIG. 19 shows all regressed lines of one example image in a first principal direction. Apparently, there exist error lines as illustrated in FIG. 19. In the subsequent stage of processing, estimated lines are pruned and used to obtain affine parameters of grids.

Figure 21:
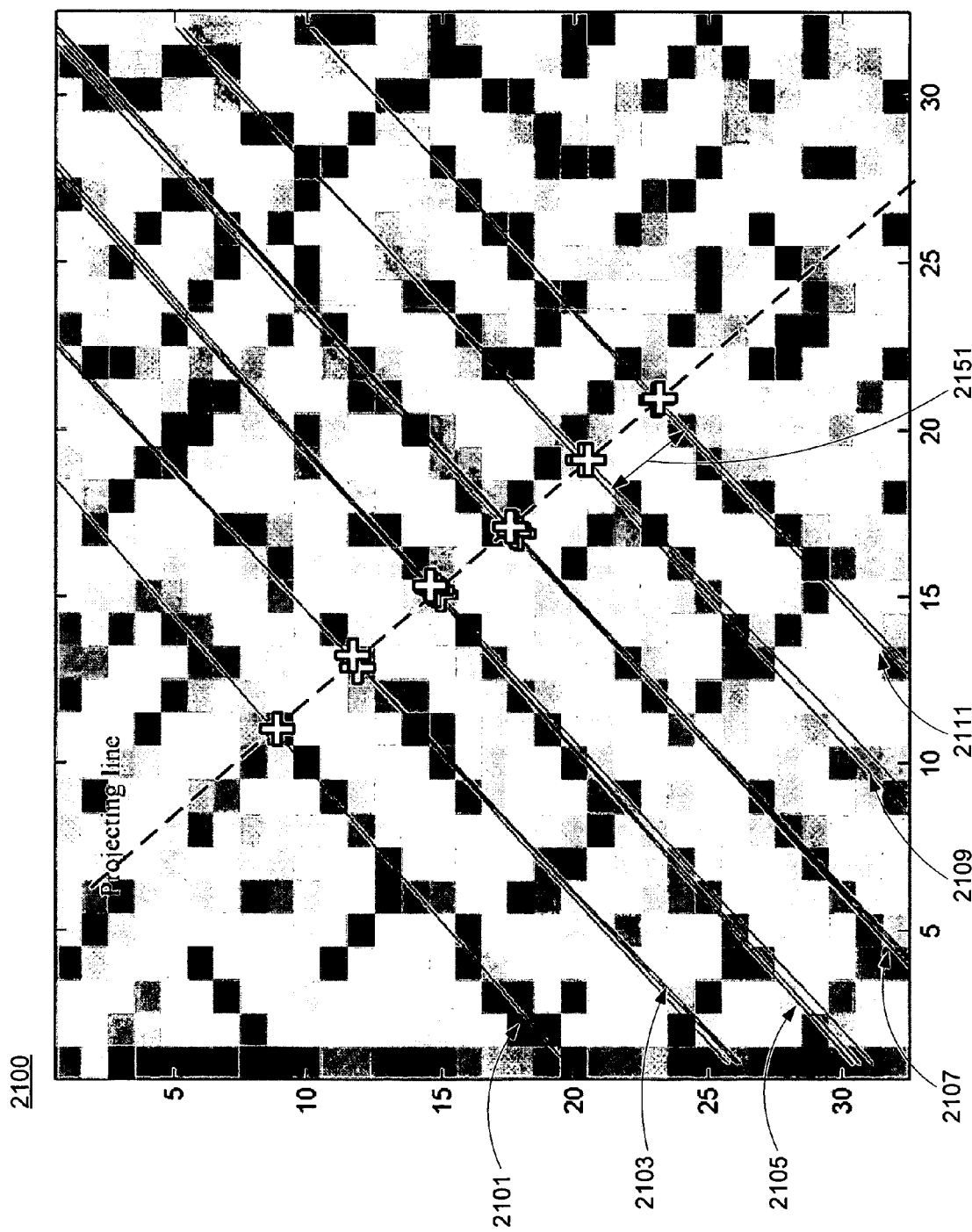
FIG. 21 shows an exemplary image of a maze pattern that illustrates pruning estimated grid lines in accordance with embodiments of the invention.

FIG. 21 shows an exemplary image of maze pattern 2100 that illustrates pruning estimated grid lines for a first principal direction in accordance with embodiments of the invention. In the embodiment, one prunes the lines by associated slope variances. The mean slope value μ and the standard deviation σ of all lines are calculated. If σ<0.05, lines are regarded as parallel and no pruning is needed. Otherwise, each line that has a slope k that differs significantly from the mean slope value μ are pruned, namely if $|k - \mu| \geq 1.5 \times \sigma$. All the kept lines after pruning are shown in FIG. 21. By averaging the slope value of all the kept lines, a final estimate of the rotation angle of the grid lines is obtained.

Then, one clusters the remaining lines by line distance, e.g., distance 2151. A line that passes the image center and is perpendicular to the mean slope of the lines is obtained. Then the intersection points between regressed lines and the perpendicular line are calculated. All intersection points are clustered with the condition that the center of any two clusters should be larger than a constant. The constant is the possible smallest scale of grid lines. The example shown in FIG. 21 has six groupings of lines: 2101, 2103, 2105, 2107, 2109, and 2111.

Figure 22:
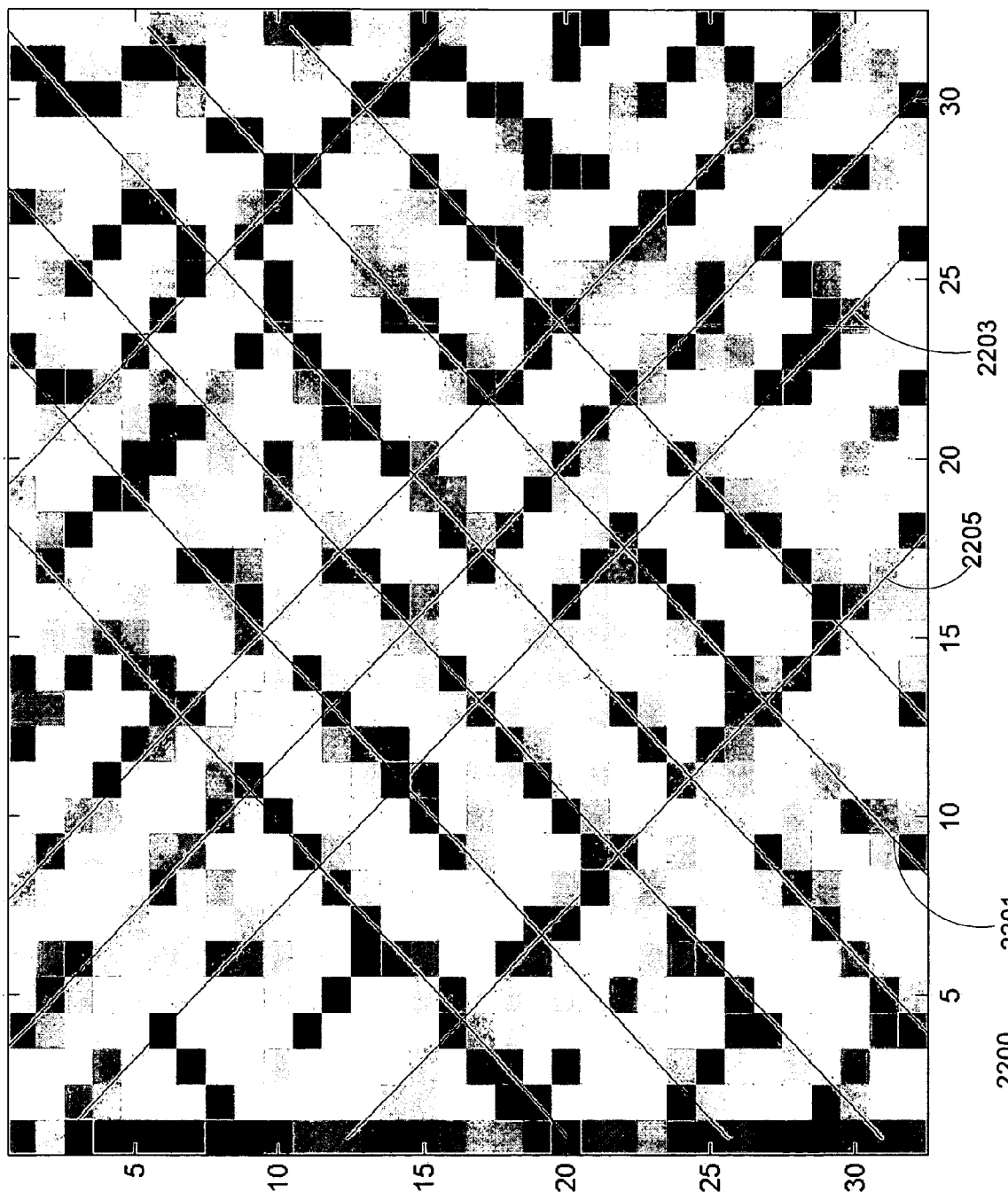
FIG. 22 shows an exemplary image of a maze pattern in which best fit lines are selected from the pruned grid lines in accordance with embodiments of the invention.

FIG. 22 shows an exemplary image of maze pattern 2200 in which best fit lines (e.g., line 2201) are selected from the pruned grid lines in accordance with embodiments of the invention. The best fit line corresponds to a line having a regression error (obtained in the robust regression step) that is smaller than the other lines in the same group of lines.

Figure 20:
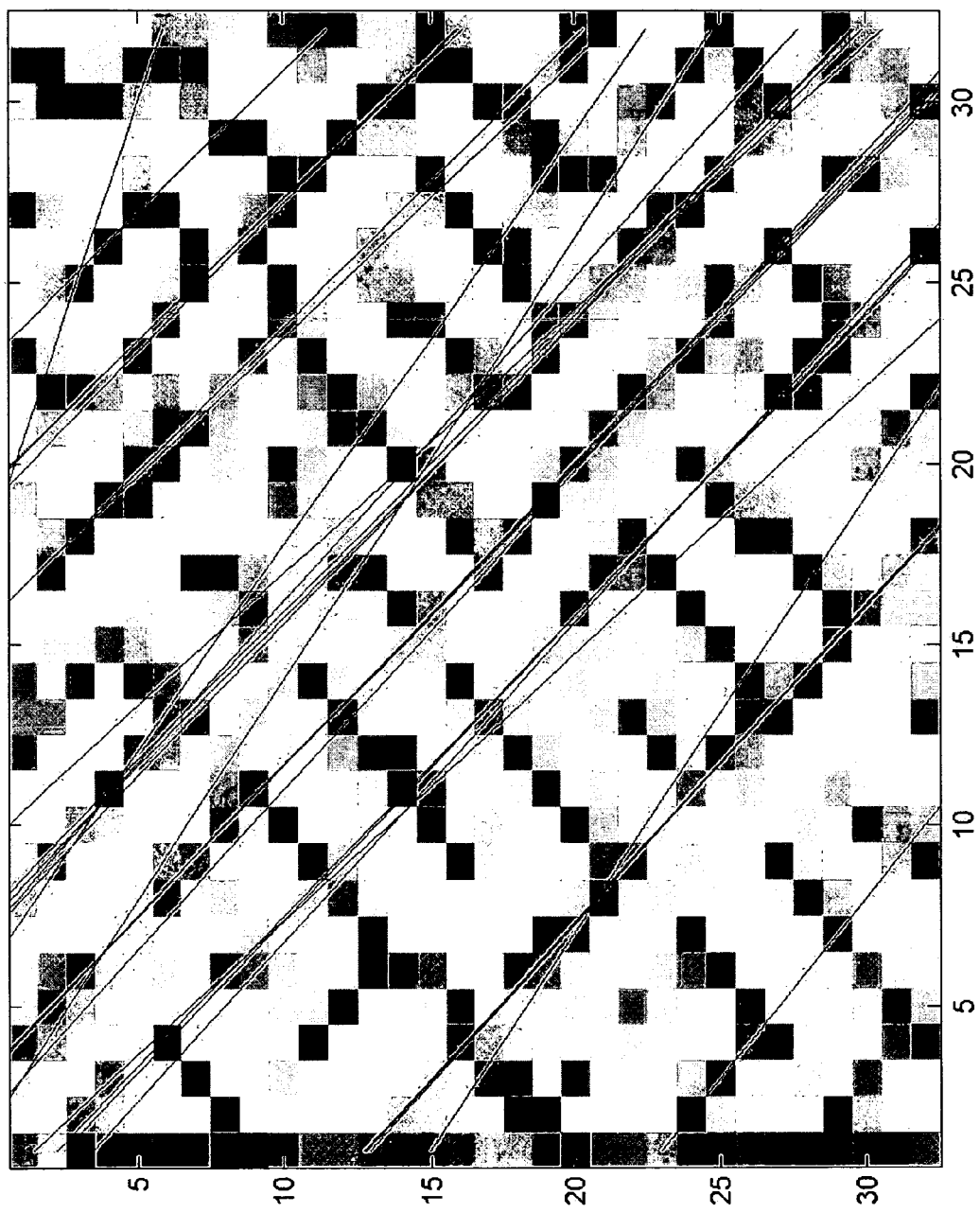
FIG. 20 shows an exemplary image of a maze pattern that illustrates estimated grid lines associated with the remaining cluster in accordance with embodiments of the invention.

FIG. 20 shows an exemplary image of maze pattern 2000 that illustrates estimated grid lines associated with the remaining cluster in accordance with embodiments of the invention. In the embodiment, grid lines are estimated using a perpendicular constraint for the remaining cluster, i.e., the direction that is perpendicular to the final estimate of the direction of the first cluster is used as the initial direction during line regression. The process is the same as illustrated in FIGS. 18-22 for the first principle direction.

Figure 23:
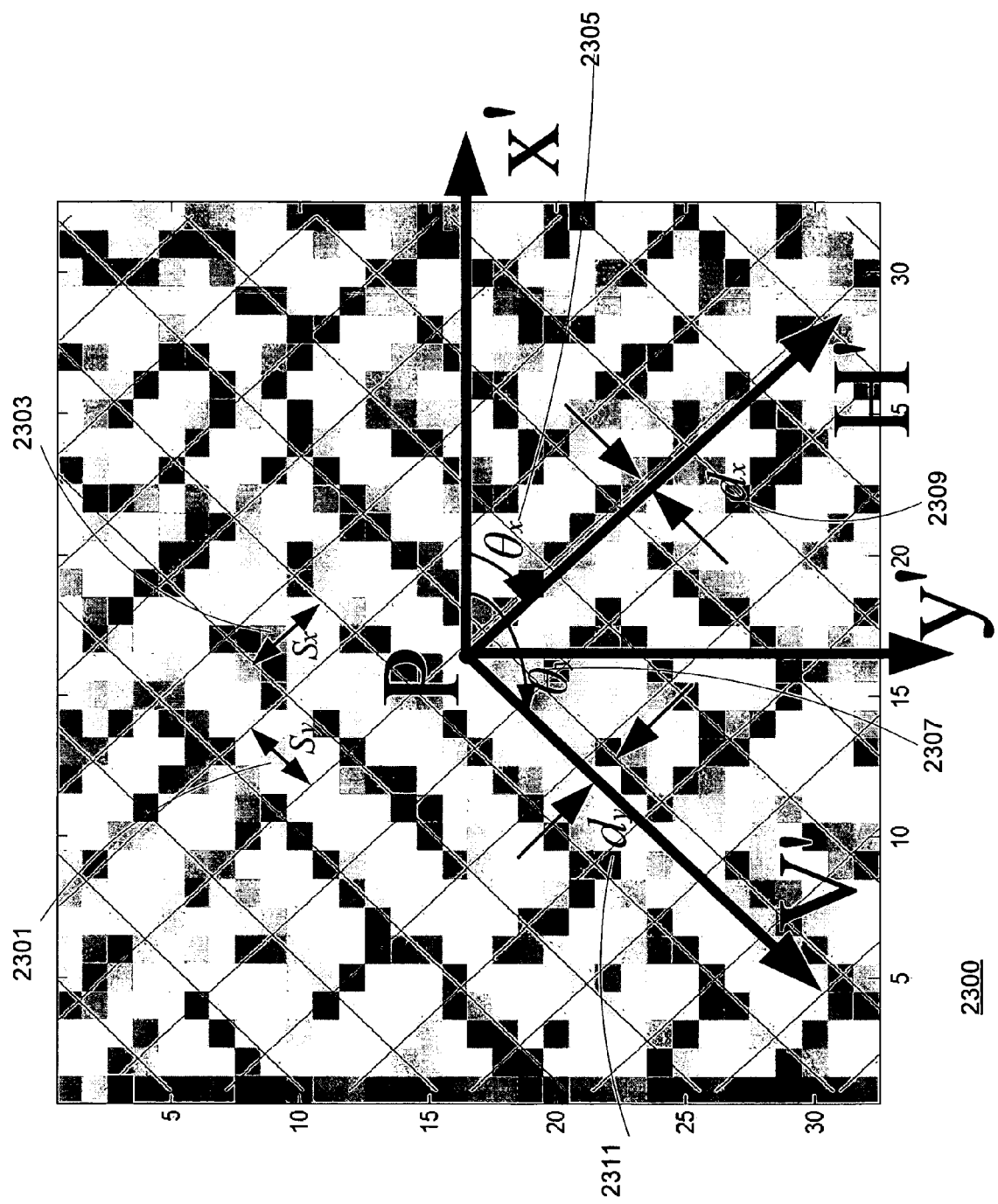
FIG. 23 shows an exemplary image of a maze pattern with associated affine parameters in accordance with embodiments of the invention.

FIG. 23 shows an exemplary image of maze pattern 2300 with associated affine parameters in accordance with embodiments of the invention. One estimates the scale ($S_y$ 2301 and $S_x$ 2303) and offset ($d_y$ 2311 and $d_x$ 2309) of grid lines. The scale is obtained by averaging the distance of adjacent best fit lines as shown in FIG. 22. The distance between two adjacent lines in FIG. 22 may be two or more times of the real scale. (For example, line 2203 and line 2205 may be two or more times of the real scale.) In other words, there is a line between 2203 and 2205 whose parameters are not obtained. A prior knowledge about the range of possible scales (given the size of the image sensor, size of maze pattern printed on paper, etc.) is used to estimate how many times a distance should be divided. In this case, the distance between line 2203 and 2205 is divided by 2 and then averaged with other distances. The offset is obtained from the distance between the image center and the nearest line to the image center. (The offset may be needed to obtain grid lines on which points are sampled to extract bits.) Assuming that the grid lines are evenly spaced and that grid lines are parallel, a group of affine parameters may be used to describe the grid lines.

The result of maze pattern analysis as shown in FIG. 23 includes the scale ($S_y$ 2301 and $S_x$ 2303), the rotation of the grid lines in two directions $\theta_x$ 2305 and $\theta_y$ 2307, and the nearest distance between grid lines in 2 directions ($d_y$ 2311 and $d_x$ 2309).

A transformation matrix $F_{S \to P}$ is obtained from the rotation and scale parameters as:

$$F_{S \to P} = \begin{bmatrix} \frac{\sin\theta_y}{s_x} & \frac{\cos\theta_y}{s_x} & 0 \\ \frac{-\sin\theta_x}{s_y} & \frac{\cos\theta_x}{s_y} & 0 \\ 0 & 0 & 1 \end{bmatrix}$$

where $F_{S \to P}$ maps the captured images in sensor plane coordinate to paper coordinate as previously discussed.

Figure 24:
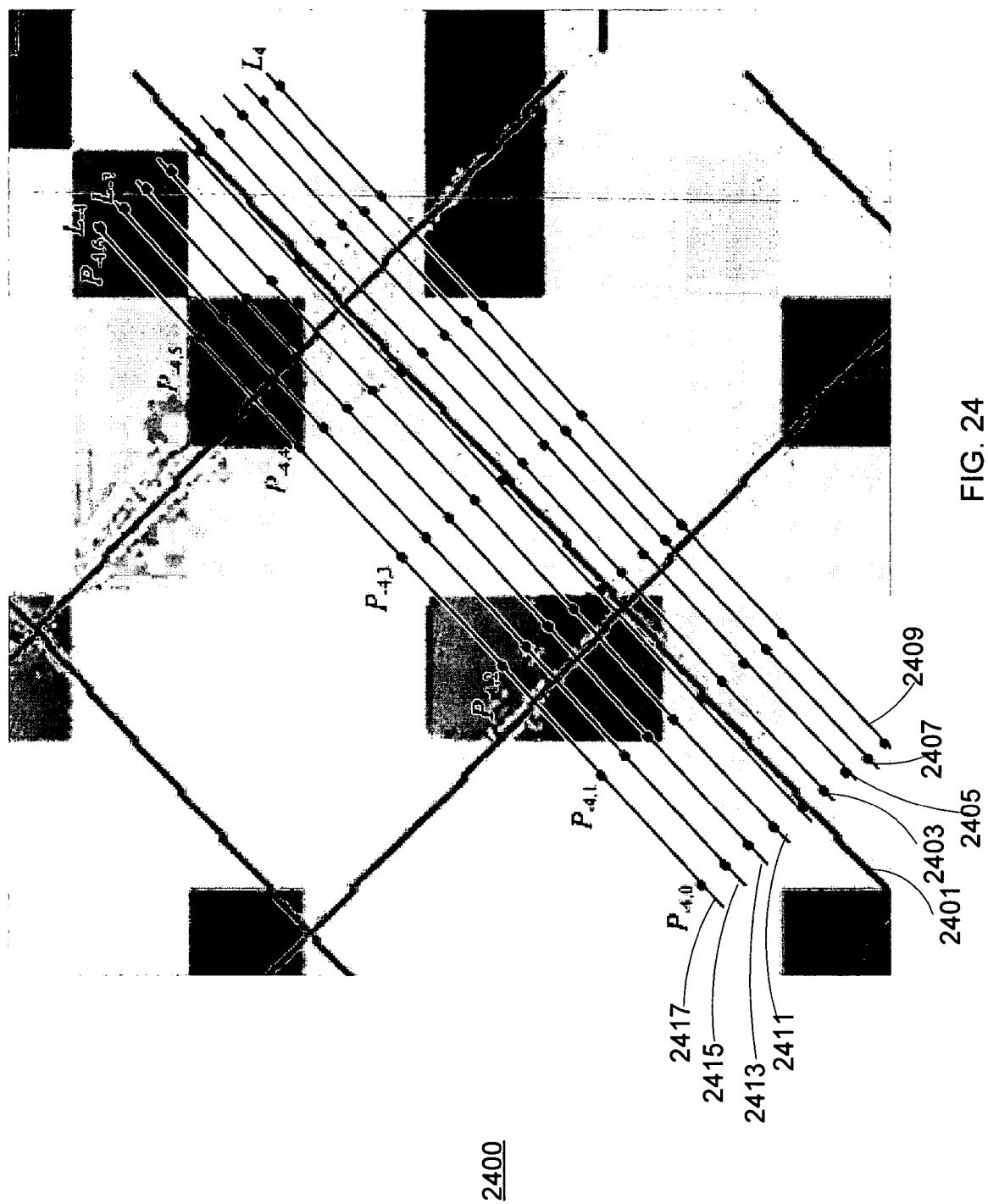
FIG. 24 shows an exemplary image of a maze pattern that illustrates tuning a grid line in accordance with embodiments of the invention.

FIG. 24 shows an exemplary image of maze pattern 2400 that illustrates tuning a grid line in accordance with embodiments of the invention. There may be several reasons that may cause the actual grid lines not to be absolutely evenly spaced, such as perspective distortion. A line that is parallel and near each obtained grid line L 2401 may be found, in which the line better approximates the actual grid line. The optimal line $L_{k_{optimal}}$ is selected from lines 2403-2417 $L_k$, k=−d, −d+1, . . . d, where the distance between L and $L_k$ is k×δ×Scale. δ is a small constant (e.g., δ=0.05), d is another constant (e.g., d=4), and scale is the grid scale ($s_x$). $k_{optimal}$ is obtained from:

$$k_{optimal} = \arg\min_{k=-d}^{d} \sum_{i=1}^{N} G(P_{k,i}) \tag{18}$$

where $P_{k,i}$ is a pixel on line $L_k$, i=1, 2, . . . , N. The selection of $P_{k,i}$ is shown in FIG. 24. $P_{k,i}$ are selected starting from one border of the image in equal distances, which may be a constant, for example, ⅓ of the scale of the direction of the line ($s_y$). In the embodiment, a smaller gray level value corresponds to a darker image element. However, other embodiments of the invention may associate a larger gray level value with a darker image element. (The "arg" function denotes that $k_{optimal}$ has a minimum gray level sum that corresponds to one of the lines having an index between −d and d.)

Figure 25:
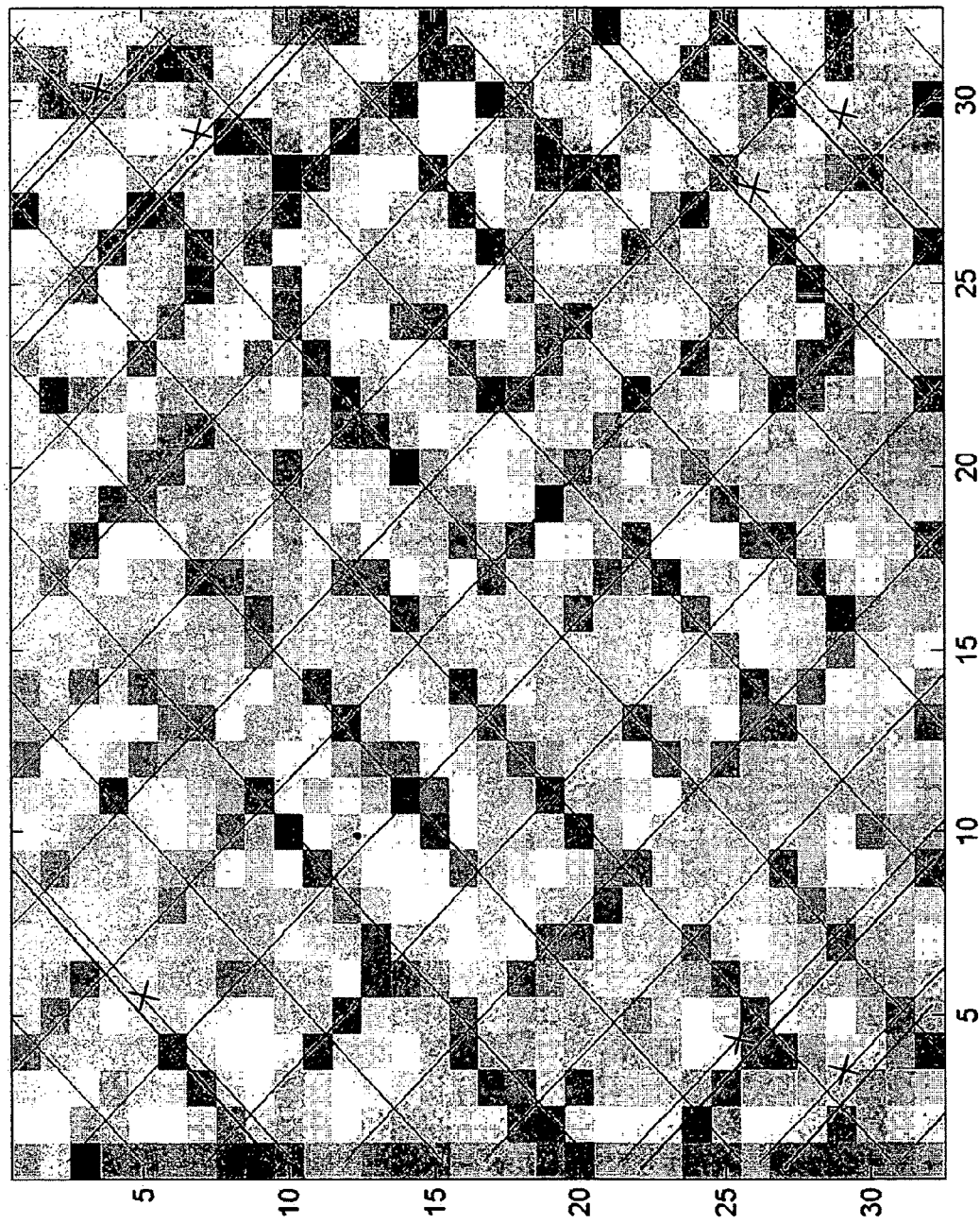
FIG. 25 shows an exemplary image of a maze pattern with grid lines after tuning in accordance with embodiments of the invention.

FIG. 25 shows an exemplary image of a maze pattern with grid lines after tuning in accordance with embodiments of the invention.

Figure 26:
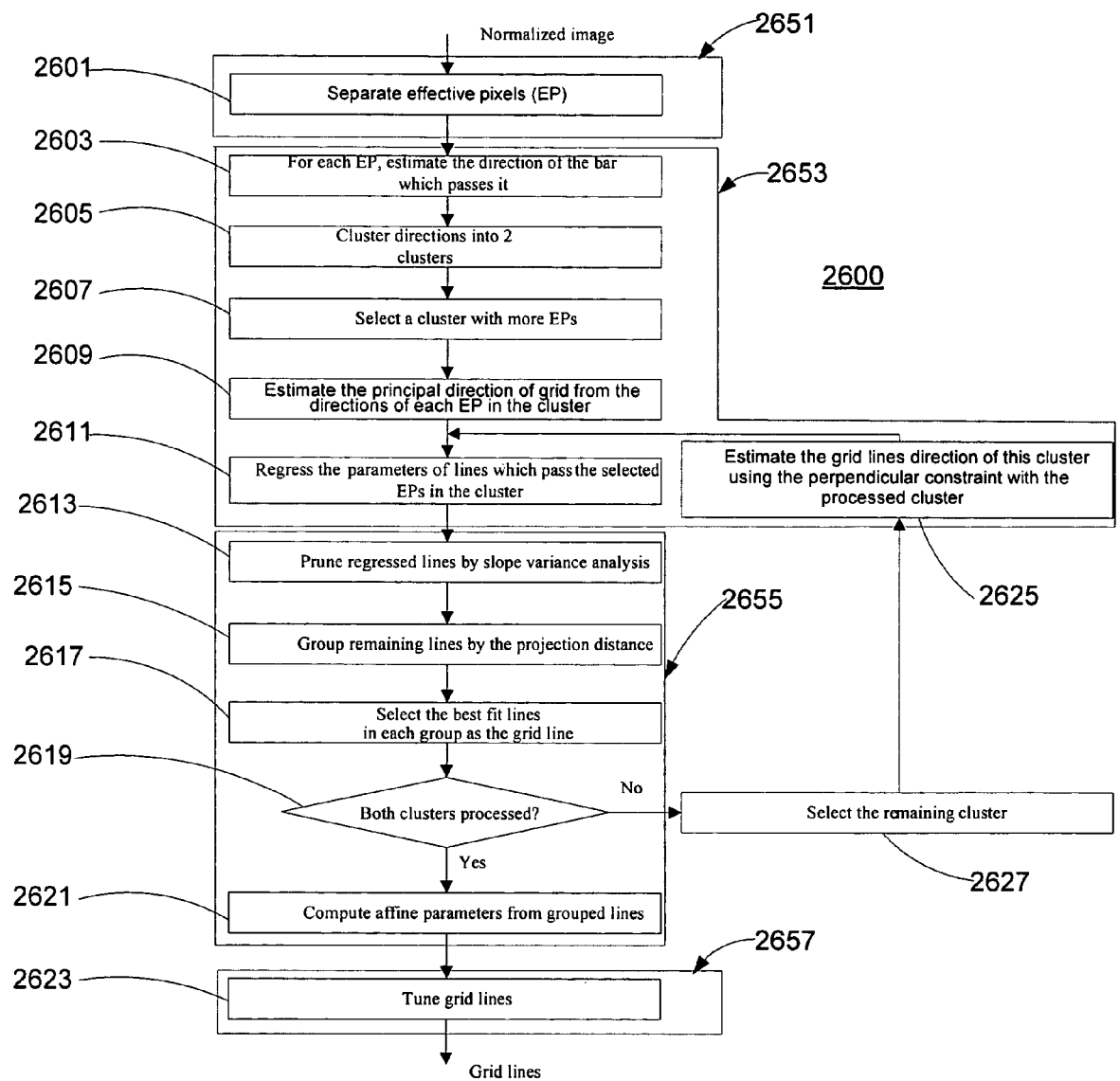
FIG. 26 shows a process for determining grid lines for a maze pattern in accordance with embodiments of the invention.

FIG. 26 shows process 2600 for determining grid lines for a maze pattern in accordance with embodiments of the invention. Process 2600 incorporates the processing as previously discussed. Process 2600 can be grouped into sub-processes 2651, 2653, 2655, and 2657. Sub-process 2651 includes step 2601, in which effective pixels are separated for an image of a maze pattern.

In sub-process 2653, lines are estimated for representative effective pixels. Sub-process 2653 comprises steps 2603-2611 and 2625. In step 2603, the direction of the maze pattern bar is estimated for each effective pixel. In step 2605, the estimated directions are grouped into two clusters. In step 2607, the cluster with the greater number of effective pixels is selected and the principal direction is estimated from the directions of the effective pixels that are associated with the selected cluster in step 2609. In step 2611, lines are estimated through selected effective pixels with regression techniques.

In sub-process 2655, affine parameters of the grid lines are determined. Sub-process 2655 includes steps 2613-2621. The lines are pruned in step 2613 by slope variance analysis and the pruned lines are grouped by the projection distance in step 2615. The best fit line is selected in each group in step 2617.

If step 2619 determines that the remaining cluster has not been processed, the remaining cluster is selected in step 2627. The associated grid lines are estimated using a perpendicular constraint in step 2625. Consequently, steps 2611-2617 are repeated. In step 2621, affine parameters are determined from the grouped lines.

In sub-process 2657, the grid lines are tuned in step 2623 as discussed with FIG. 24.

Figure 27:
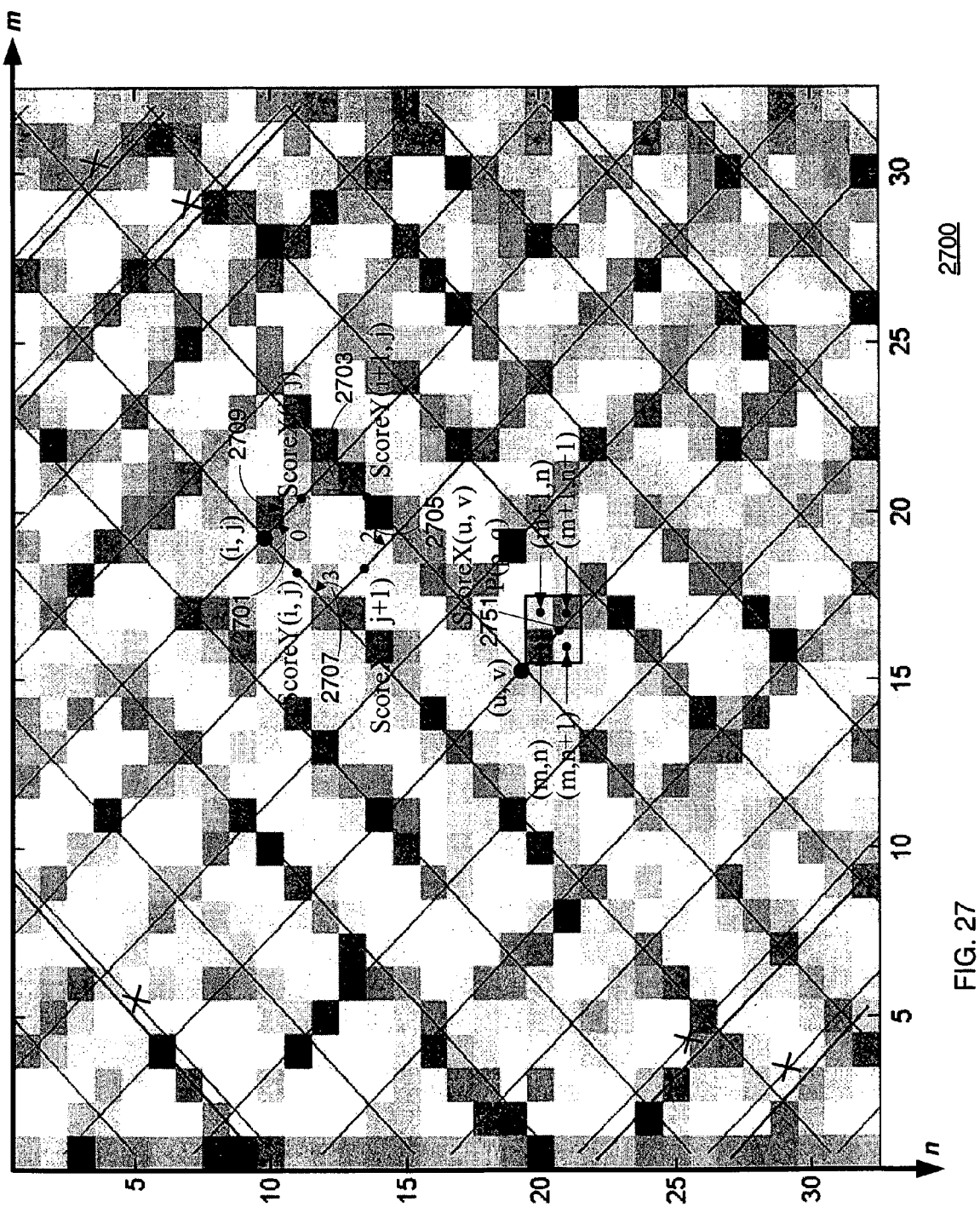
FIG. 27 shows an exemplary image of a maze pattern that illustrates determining a correct orientation of the maze pattern in accordance with embodiments of the invention.

FIG. 27 shows an exemplary image of a maze pattern that illustrates determining a correct orientation of the maze pattern in accordance with embodiments of the invention. After detecting grid lines, the correct orientation of the maze pattern has to be determined. In the embodiment, one determines the correct orientation of maze pattern based on the corner property of maze patterns. The algorithm has three stages. As shown in FIG. 27, grid edges are separated into two groups, i.e., X and Y edges that are parallel with H axis and V axis respectively, and with corresponding scores are represented as ScoreX and ScoreY. Scores are calculated by bilinear sampling algorithm. As FIG. 27 shows, the bilinear sampling score is calculated by the following formula:

$$ScoreX(u,v) = (1-\eta_q) \cdot [(1-\eta_p) \cdot G(m,n) + \eta_p \cdot G(m+1,n)] + \eta_q \cdot [(1-\eta_p) \cdot G(m,n+1) + \eta_p \cdot G(m+1,n+1)] \tag{19}$$

where (p, q) is the position of sampling point 2751 (P) in image coordinates, ScoreX(u,v) is the score of edge (u, v) along H' axis, where u and v are indexes of grid lines along H' and V' axis respectively (in FIG. 27, the range of indexes along H' axis is [0, 13] and [0, 15] along V' axis, and u=7, v=9), (m, n), (m+1,n), (m, n+1) and (m+1,n+1) are the nearest four pixels of point 2751, G(m,n), G(m+1,n), G(m, n+1) and G(m+1,n+1) are the gray level values of each pixel respectively, and $\eta_p$=p−m, $\eta_q$=q−n. A score is valid (therefore is actually calculated using equation 19) if all the pixels for bilinear sampling are located in the image (i.e. 0<=p<31, 0<=q<31 for a 32×32 pixel image sensor), and are non-document content pixels. In the embodiment, the sampling point on each edge to calculate the score corresponds to the middle point of the edge. ScoreY is calculated by the same bilinear sampling algorithm as ScoreX except for using a different sampling point in the image as the bilinear input Referring to FIG. 27, maze pattern cell 2709 is associated with corners 2701, 2703, 2705, and 2707. In the following discussion, corners 2701, 2703, 2705, and 2707 correspond to corner 0, corner 1, corner 2, and corner 3, respectively. The associated number of a corner is referred to as the quadrant number as will be discussed.

As previously discussed in the context of FIGS. 5A-5D, when a maze pattern is properly oriented, the type of corner shown in FIG. 5A (corresponding to corner 0) is missing. When a maze pattern is rotated 90 degrees clockwise, the type of corner shown in FIG. 5B (corresponding to corner 1) is missing. When a maze pattern is rotated 180 degrees clockwise, the type of corner shown in FIG. 5V (corresponding to corner 3) is missing. When a maze pattern is rotated 270 degrees clockwise, the type of corner shown in FIG. 5D (corresponding to corner 4) is missing. By determining the type of missing corner, one can correctly orientate the maze pattern by rotating the maze pattern by:

OrientationRotation=quadrantnumber×90 deg  (21)

In an embodiment, one determines the type of missing corner by calculating the mean score difference of each corner type. For corner 2701 (corner 0), the mean score difference Q[0] is:

$$Q[0] = \left( \sum_{i=0}^{n_i-1} \sum_{j=0}^{n_j-1} |ScoreX(i, j) - ScoreY(i, j)| \right) / N_0 \quad (22)$$

where $n_i$ and $n_j$ are the total count of grid cells within the image in H axis and V axis direction respectively. For example, in FIG. 27, $n_i$=14, $n_j$=16, and $N_0$ is the number of grid cells in which both ScoreX(i, j) and ScoreY(i, j) are valid. (The validity of ScoreX(i,j) and ScoreY(i,j) is determined by bilinear sampling shown in Equation 19.)

For corner 2703 (corner 1), the mean score difference Q[1] is:

$$Q[1] = \left( \sum_{i=0}^{n_i-1} \sum_{j=0}^{n_j-1} |ScoreX(i, j) - ScoreY(i+1, j)| \right) / N_1 \quad (23)$$

where $n_i$ and $n_j$ are the total count of grids within the image in H axis and V axis direction respectively, $N_1$ is the number of grid cells in which both ScoreX(i, j) and ScoreY(i+1, j) are valid.

For corner 2705 (corner 2), the mean score difference Q[2] is:

$$Q[2] = \left( \sum_{i=0}^{n_i-1} \sum_{j=0}^{n_j-1} |ScoreX(i, j+1) - ScoreY(i+1, j)| \right) / N_2 \quad (24)$$

where $n_i$ and $n_j$ are the total count of grids within the image in H axis and V axis direction respectively, $N_2$ is the number of grid cells in which both ScoreX(i, j+1) and ScoreY(i+1, j) are valid.

For corner 2707 (corner 3), the mean score difference Q[3] is:

$$Q[3] = \left( \sum_{i=0}^{n_i-1} \sum_{j=0}^{n_j-1} |ScoreX(i, j+1) - ScoreY(i, j)| \right) / N_3 \quad (25)$$

where $n_i$ and $n_j$ are the total count of grids within the image in H axis and V axis direction respectively, $N_3$ is the number of grid cells in which both ScoreX(i, j+1) and ScoreY(i, j) are valid.

The correct orientation is i if Q[i] is maximum of Q, where i is the quadrant number. In an embodiment, one rotates the grid coordinate system H', V' of the maze pattern to the correct orientation i (corresponding to Equation 21) so that corner 0 in the new coordinate system is the correct corner. ScoreX and ScoreY are also rotated for the next stage of extracting bits from the maze pattern.

After determining the correct orientation of maze pattern, bits are extracted. Maze pattern cells in captured images fall into two categories: completely visible cells and partially visible cells. Completely visible cells are maze pattern cells in which both ScoreX and ScoreY are valid. Partially visible cells are the maze pattern cells in which only one score of ScoreX and ScoreY is valid.

A complete visible bits extraction algorithm is based on a simple gray level value comparison of ScoreX and ScoreY, and bit B(i, j) is calculated by:

$$B(i, j) = \begin{cases} 0, & \text{if } ScoreX(i, j) < ScoreY(i, j) \\ 1, & \text{if } ScoreX(i, j) > ScoreY(i, j) \\ \text{invalid}, & \text{if } ScoreX(i, j) = ScoreY(i, j) \end{cases} \quad (26)$$

The corresponding bit confidence Conf (i, j) is calculated by:

Conf(i, j)=|ScoreX(i, j)−ScoreY(i, j)|/MaxDiff  (27)

where MaxDiff is the maximum score difference of all complete visible cells.

Figure 28:
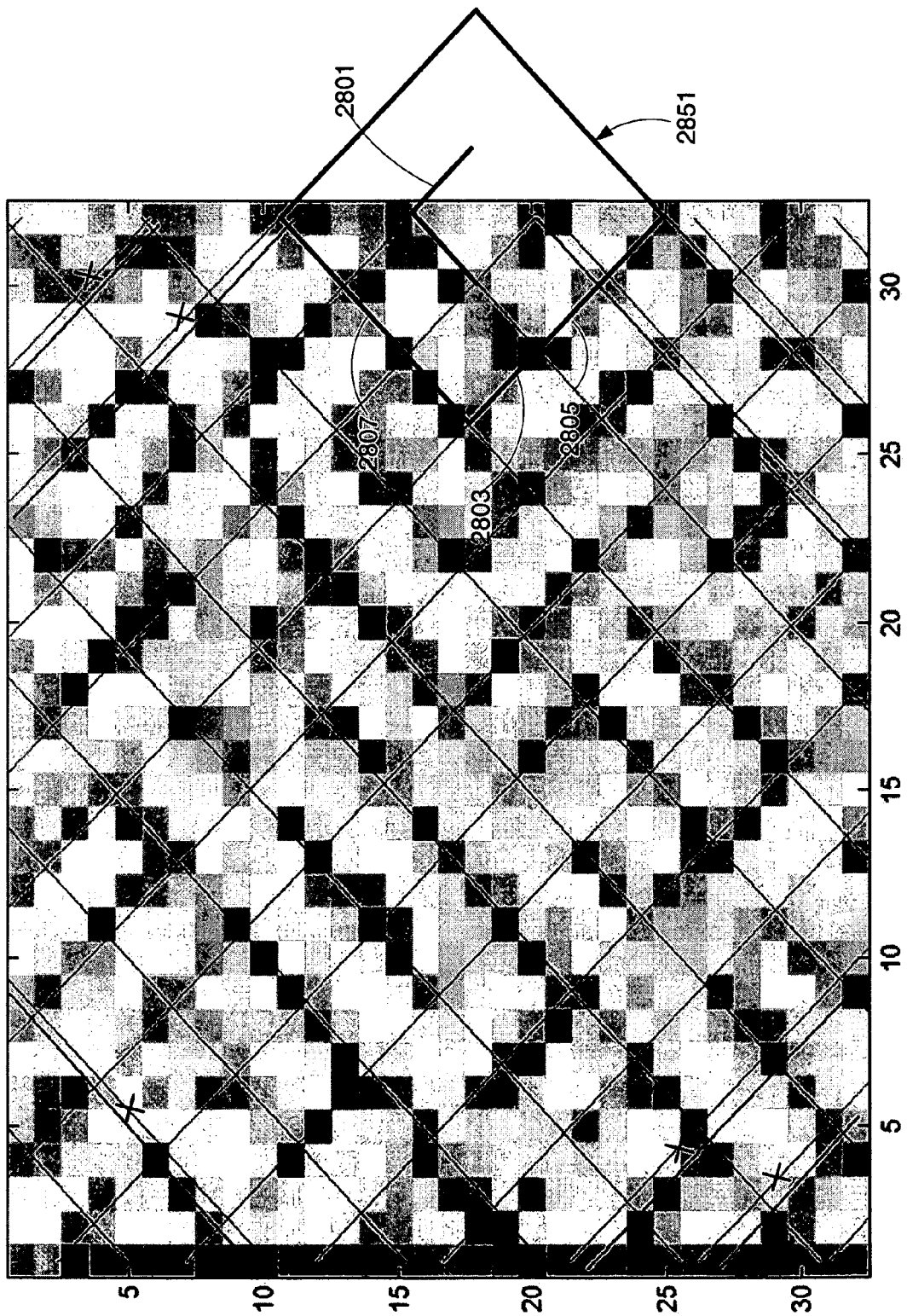
FIG. 28 shows an exemplary image of a maze pattern in which a bit is extracted from a partially visible maze pattern cell in accordance with embodiments of the invention.

FIG. 28 shows an exemplary image of maze pattern 2800 in which a bit is extracted from partially visible maze pattern cell 2801 in accordance with embodiments of the invention. A partially visible maze pattern cell may occur at an edge of an image or in an area of an image where text or drawings obscure the maze pattern. In an embodiment, a partially visible bits extraction algorithm is based on completely visible cells (corresponding to maze pattern cells 2803, 2805, and 2807) in the 8-neighbor cells of partially visible cell 2801. For extracting a bit from a cell that is partially visible (e.g. maze pattern cell 2801), one may compare score values of the partially visible maze pattern cell with a function of mean scores along edges of neighboring maze pattern cells (e.g., maze pattern cells 2803, 2805, and 2807).

In an embodiment of the invention for a partially visible bit (i, j), the reference black edge mean score (BMS) and reference white edge mean score (WMS) of complete visible bits in 8-neighor maze pattern cells can be calculated respectively by following:

$$BMS = \left( \sum_{l=i-1}^{i+1} \sum_{k=j-1}^{j+1} \min(ScoreX(l, k), ScoreY(l, k)) \right) / n \quad (28)$$

$$WMS = \left( \sum_{l=i-1}^{i+1} \sum_{k=j-1}^{j+1} \max(ScoreX(l, k), ScoreY(l, k)) \right) / n \quad (29)$$

where n is the completely visible maze pattern cell count in 8-neighor maze pattern cells.

In an embodiment, one compares ScoreX or ScoreY of a partially visible bit with BMS and WMS. A partially visible bit B(i, j) is calculated by:

$$B(i, j) = \begin{cases} 0, \text{ if } ScoreX(i, j) \text{ is valid}, ScoreX(i, j) < \frac{BMS + WMS}{2} & (30) \\ 1, \text{ if } ScoreX(i, j) \text{ is valid}, ScoreX(i, j) > \frac{BMS + WMS}{2} \\ 1, \text{ if } ScoreY(i, j) \text{ is valid}, ScoreY(i, j) < \frac{BMS + WMS}{2} \\ 0, \text{ if } ScoreY(i, j) \text{ is valid}, ScoreY(i, j) > \frac{BMS + WMS}{2} \\ \text{invalid, if other cases} \end{cases}$$

In an embodiment of the invention, a degree of confidence of the partially visible bit (i, j) is determined by:

$$\text{Conf}(i, j) = \max(|Score(i, j) - BMS|, |Score(i, j) - WMS|) / \text{MaxDiff} \quad (31)$$

where Score(i, j) is the valid score of ScoreX(i, j) or ScoreY(i, j), and MaxDiff is a maximum score difference of all complete visible bits. (As previously discussed, with a partially visible cell, only one score is valid.)

Referring to FIG. 12, extracted bits 1201 are decoded, and error correction is performed if needed. In an embodiment of the invention, selected bits that have a confidence level greater than a predetermined level are used for error correction if the number of selected bits is sufficiently large. (As previously discussed, at least n bits are necessary to decode an m-sequence, where n is the order of the m-sequence.) In another embodiment, the extracted bits are rank ordered in accordance with associated confidence levels. Decoding of the extracted bits utilizes extracted bits according to the rank ordering.

In an embodiment of the invention, the degree of confidence associated with an extracted bit may be utilized when correcting for bit errors. For example, bits having a lowest degree of confidence are not processed when performing error correction.

Figure 29:
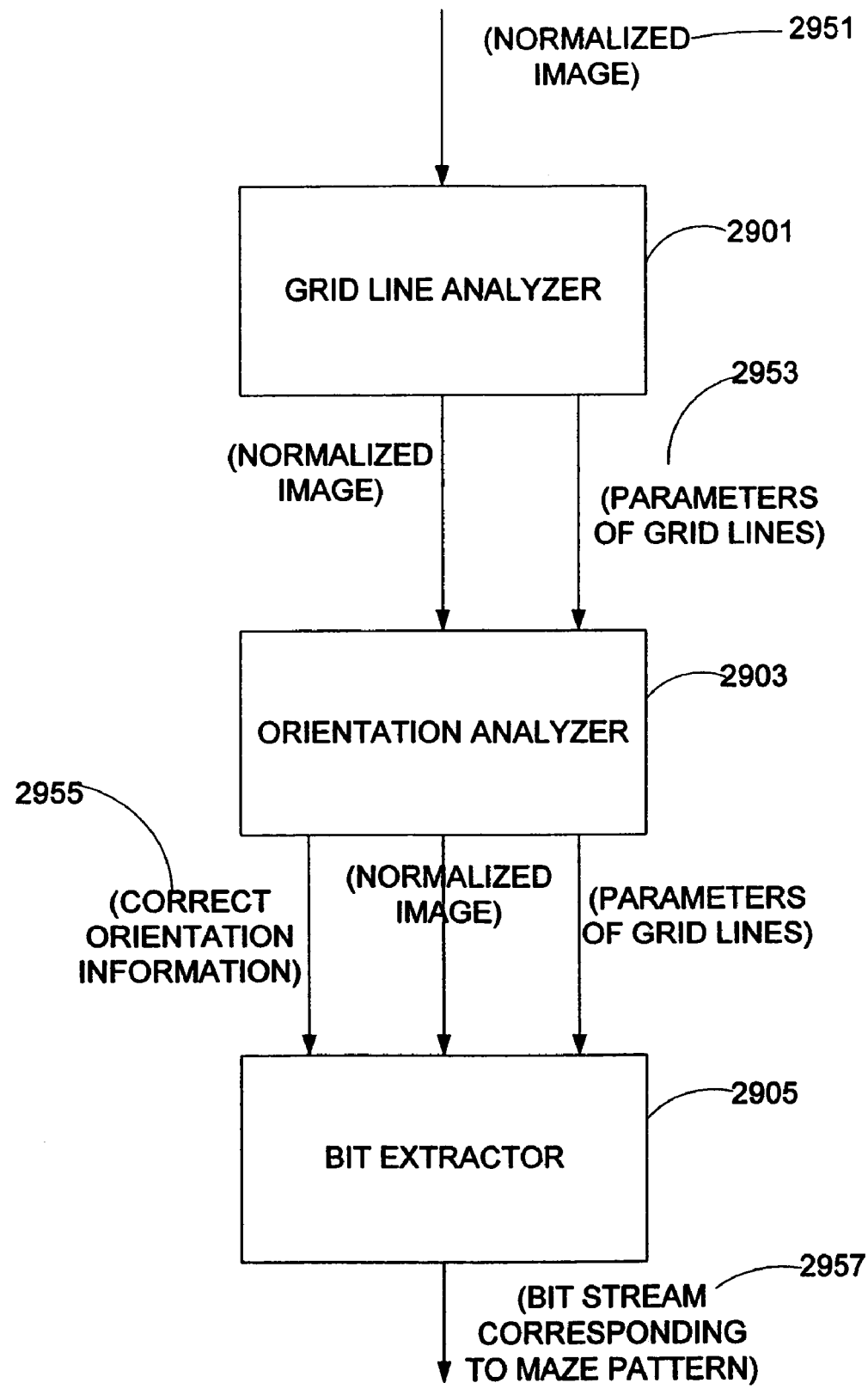
FIG. 29 shows apparatus for extracting bits from a maze pattern in accordance with embodiments of the invention.

FIG. 29 shows apparatus 2900 for extracting bits from a maze pattern in accordance with embodiments of the invention. Normalized image 2951 is first processed by grid lines analyzer 2901 in order to determine the grid lines of the image. In an embodiment of the invention, grid line analyzer 2901 performs process 2600 as shown in FIG. 26. Grid line analyzer 2901 determines grid line parameters 2953 (e.g., $S_x$, $S_y$, $\theta_x$, $\theta_y$, $d_x$, $d_y$ as shown in FIG. 23). Orientation analyzer 2903 further processes normalized image 2951 using grid line parameters 2953 to determine correct orientation information 2955 of the maze pattern. Bit extractor 2905 processes normalized image 2951 using grid line parameters 2953 and correct orientation information 2955 to extract bit stream 2957.

Additionally, apparatus 2900 may incorporate an image normalizer (not shown) that reduces the effect of non-uniform illumination of the image. Non-uniform illumination may cause some pattern bars not to be as dark as they should be and some non-bar areas to be darker than they should be, which may affect the estimate of the direction of effective pixels and may result in error bits being extracted.

Apparatuses 1400 and 2900 may assume different forms of implementation, including modules utilizing computer-readable media and modules utilizing specialized hardware such as an application specific integrated circuit (ASIC).

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

Although the invention has been defined using the appended claims, these claims are illustrative in that the invention is intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations.

We claim:

1. A method for analyzing a captured image of a maze pattern and document content and for determining associated bits of an m-array from a document representation, the document representation being watermarked by the maze pattern, the method comprising:
   (A) detecting a plurality of grid lines from a plurality of effective pixels;
   (B) determining a correct orientation of the maze pattern; and
   (C) extracting a plurality of bits from the maze pattern, wherein the plurality of bits contains associated m-array information.

2. The method of claim 1, further comprising:
   (D) determining a confidence level that is associated with a bit from the maze pattern.

3. The method of claim 2, further comprising:
   (E) selecting a subset from the plurality of bits, each bit of the subset having an associated confidence level that is greater than a predetermined level.

4. The method of claim 3, further comprising:
   (F) decoding a position in the m-array from the subset of bits.

5. The method of claim 1, wherein (A) comprises:
   (i) separating effective pixels in the captured image of the maze pattern.

6. The method of claim 5, wherein (A) further comprises:
   (ii) estimating an estimated line for each selected effective pixel.

7. The method of claim 6, wherein (A) further comprises:
   (iii) determining grid line parameters for the plurality of grid lines.

8. The method of claim 7, wherein (A) further comprises:
   (iv) tuning the plurality of grid lines.

9. The method of claim 6, wherein (ii) comprises:
   (1) estimating a plurality of directions, each direction corresponding to a maze pattern bar passing through an effective pixel.

10. The method of claim 9, wherein (ii) further comprises:
    (2) forming two clusters from the plurality of directions.

11. The method of claim 10, further comprising:
    (3) determining an initial estimated direction for each of the two clusters from a histogram of all estimated directions.

12. The method of claim 10, wherein (ii) further comprises:
    (3) selecting one of the two clusters that is associated with a greater number of effective pixels.

13. The method of claim 12, wherein (ii) further comprises:
(4) estimating a principal direction from associated directions of said one cluster.

14. The method of claim 13, wherein (ii) further comprises:
(5) determining a corresponding line parameter set for each chosen effective pixel, each corresponding line parameter set corresponding to a regressed line.

15. The method of claim 14, wherein (5) comprises performing a regression analysis for a corresponding plurality of effective pixels associated with each said chosen effective pixel.

16. The method of claim 15, wherein (ii) further comprises:
(6) using a perpendicular constraint to estimate a grid line direction of another cluster.

17. The method of claim 7, wherein (iii) utilizes a slope variance analysis.
(1) pruning a plurality of regressed lines to form a pruned set of lines.

18. The method of claim 17, wherein (1) utilizes slope variance analysis.

19. The method of claim 17, wherein (iii) further comprises:
(2) grouping the pruned set of lines to form a plurality of line groups.

20. The method of claim 19, wherein (2) utilizes associated projection distances between adjacent line groups.

21. The method of clam 19, wherein (iii) further comprises:
(3) selecting a best fit line for each group of the plurality of line groups.

22. The method of claim 21, wherein (iii) further comprises:
(4) determining at least one affine parameter from a plurality of best fit lines.

23. The method of claim 22, wherein the at least one affine parameter is selected from the group consisting of a horizontal scale ($S_x$), a vertical scale ($S_y$), a horizontal offset ($d_x$), a vertical offset ($d_y$), a horizontal rotation ($\theta_x$), and a vertical rotation ($\theta_y$).

24. The method of claim 8, wherein (iv) comprises:
(1) determining at least one line sufficiently near a selected best fit line, the at least one line being approximately parallel to the selected best fit line and within a predetermined distance of the best fit line.

25. The method of claim 24, wherein (iv) further comprises:
(2) selecting one line from the at least one line and the best fit line, the one line having a darkest characteristic.

26. The method of claim 24, wherein (iv) further comprises:
(2) selecting one line from the at least one line and the best fit line, the one line having a smallest gray level sum.

27. The method of claim 1, wherein (B) comprises:
(i) determining a type of missing corner.

28. The method of claim 27, wherein (B) comprises:
(ii) rotating the maze pattern according to the type of missing corner.

29. The method of claim 27, wherein (i) comprises:
(1) determining a mean score difference of each corner type; and
(2) selecting the type of missing corner that corresponds to a maximum mean score difference.

30. The method of claim 29, wherein a score value is based on a bilinear sampling.

31. The method of claim 1, wherein (C) comprises:
(i) if a maze pattern cell is completely visible, performing a gray level value comparison of a horizontal score (ScoreX(·)) with a vertical score (ScoreY(·)) to extract a corresponding bit; and
(ii) if the maze pattern cell is partially visible, comparing a function of edge mean scores with the horizontal score and the vertical score, the edge mean scores corresponding to neighbor maze pattern cells that are completely visible.

32. The method of claim 31, wherein (i) comprises:
(1) if the horizontal score is less than the vertical score, equating the corresponding bit to '0';
(2) if the horizontal score is greater than the vertical score, equating the corresponding bit to '1'; and
(3) if the horizontal score is equal to the vertical score, invalidating the corresponding bit.

33. The method of claim 31, wherein the function equals an average of a reference black edge mean score (BMS) and a reference white edge mean score (WMS) of the neighbor maze pattern cells that are completely visible.

34. The method of claim 2, wherein (D) comprises:
(i) equating the confidence level to a function of a horizontal score (Score(X(·)) and a vertical score (Score(Y(·)).

35. The method of claim 34, wherein the function is proportional to an absolute value of a difference of the horizontal score and the vertical score.

36. The method of claim 31, wherein a score value is based on a bilinear sampling.

37. The method of claim 5, wherein (i) comprises:
(1) estimating a number of the effective pixels.

38. The method of claim 37, wherein (1) utilizes a ratio that is approximated by an area of the maze pattern bar divided by an area of a maze pattern cell.

39. A computer-readable medium having computer-executable instructions for performing the method as recited in claim 1.

40. A computer-readable medium having computer-executable instructions for performing the method as recited in claim 2.

41. A computer-readable medium having computer-executable instructions for performing the method as recited in claim 3.

42. A computer-readable medium having computer-executable instructions for performing the method as recited in claim 4.

43. A computer-readable medium having computer-executable instructions for performing the method as recited in claim 5.

44. A computer-readable medium having computer-executable instructions for performing the method as recited in claim 6.

45. A computer-readable medium having computer-executable instructions for performing the method as recited in claim 7.

46. A computer-readable medium having computer-executable instructions for performing the method as recited in claim 8.

47. A computer-readable medium having computer-executable instructions for performing the method as recited in claim 27.

48. A computer-readable medium having computer-executable instructions for performing the method as recited in claim 28.

49. A computer-readable medium having computer-executable instructions for performing the method as recited in claim 31.

50. A computer-readable medium having computer-executable instructions for performing the method as recited in claim 34.

51. An apparatus for analyzing an image of a maze pattern, comprising:
- a grid line analyzer that obtains an image and that determines grid lines of the image from a plurality of estimated lines;
- an orientation analyzer that further processes the image to determine a type of missing corner and to determine a correct orientation of the maze pattern; and
- a bit extractor that processes the maze pattern along the grid lines to extract bits from the maze pattern.

52. The apparatus of claim 51, wherein the bit extractor determines a confidence level associated with an extracted bit.

53. The apparatus of claim 51, wherein the grid line analyzer tunes the grid lines.

54. The apparatus of claim 51, further comprising:
- an image normalizer that normalizes the gray level values that are associated with pixels of the image to compensate for illumination.

* * * * *